US012664003B1

(12) United States Patent
Carfa et al.

(10) Patent No.: US 12,664,003 B1
(45) Date of Patent: Jun. 23, 2026

(54) METHODS AND APPARATUS FOR GENERATING AT LEAST ONE CONFIGURATION USING AN INTELLIGENCE MODEL IN A COMPUTING NETWORK

(71) Applicant: SRS Distribution Inc., McKinney, TX (US)

(72) Inventors: Kevin Carfa, Dallas, TX (US); Ashley Garcia, Floresville, TX (US); Patrick Garcia, Prosper, TX (US); Michael Johnson, Richardson, TX (US); Aditya Khedkar, Richardson, TX (US); Bryan Smith, Irving, TX (US)

(73) Assignee: SRS Distribution Inc., McKinney, TX (US)

( * ) Notice: Subject to any disclaimer, the term of this patent is extended or adjusted under 35 U.S.C. 154(b) by 0 days.

(21) Appl. No.: 19/284,239

(22) Filed: Jul. 29, 2025

(51) Int. Cl.
*G06F 9/445* (2018.01)
*G06F 9/451* (2018.01)
*G06Q 30/0601* (2023.01)

(52) U.S. Cl.
CPC .......... *G06F 9/44505* (2013.01); *G06F 9/453* (2018.02); *G06Q 30/0621* (2013.01)

(58) Field of Classification Search
CPC ........................ G06F 9/44505; G06Q 30/0621
USPC .............................................. 705/26.1–27.2
See application file for complete search history.

(56) References Cited

U.S. PATENT DOCUMENTS

| | | | |
|---|---|---|---|
| 2012/0226573 A1* | 9/2012 | Zakas ................ | G06Q 30/0601 705/26.7 |
| 2024/0420214 A1* | 12/2024 | Wilson ................... | G06Q 40/08 |
| 2025/0265629 A1* | 8/2025 | Lin .................... | G06Q 30/0631 |

OTHER PUBLICATIONS

Sutherlands Home Improvement Building Packages (sutherlands.com/c/Building-packages) (Year: 2024).*

* cited by examiner

*Primary Examiner* — Ashley D Preston
(74) *Attorney, Agent, or Firm* — Baker & McKenzie LLP

(57) ABSTRACT

Disclosed are methods and systems for generating at least one configuration using an intelligence model. An exemplary method includes: determining a first user accesses a first system; receiving, from the first user, a first selection comprising a first configuration option; transmitting a first configuration object for display on a first user interface; receiving, from the first user, a first input comprising location data; receiving, from the first user, a second input comprising a computing group; receiving, from the first user, a third input comprising at least one customization selection; generating, using a first intelligence model, based on the first input, the second input, and the third input, at least one configuration, wherein a first configuration comprised in the at least one configuration comprises at least one item and security data; ranking the at least one configuration; and transmitting the at least one configuration for display on the first user interface.

21 Claims, 22 Drawing Sheets

Figure 6:
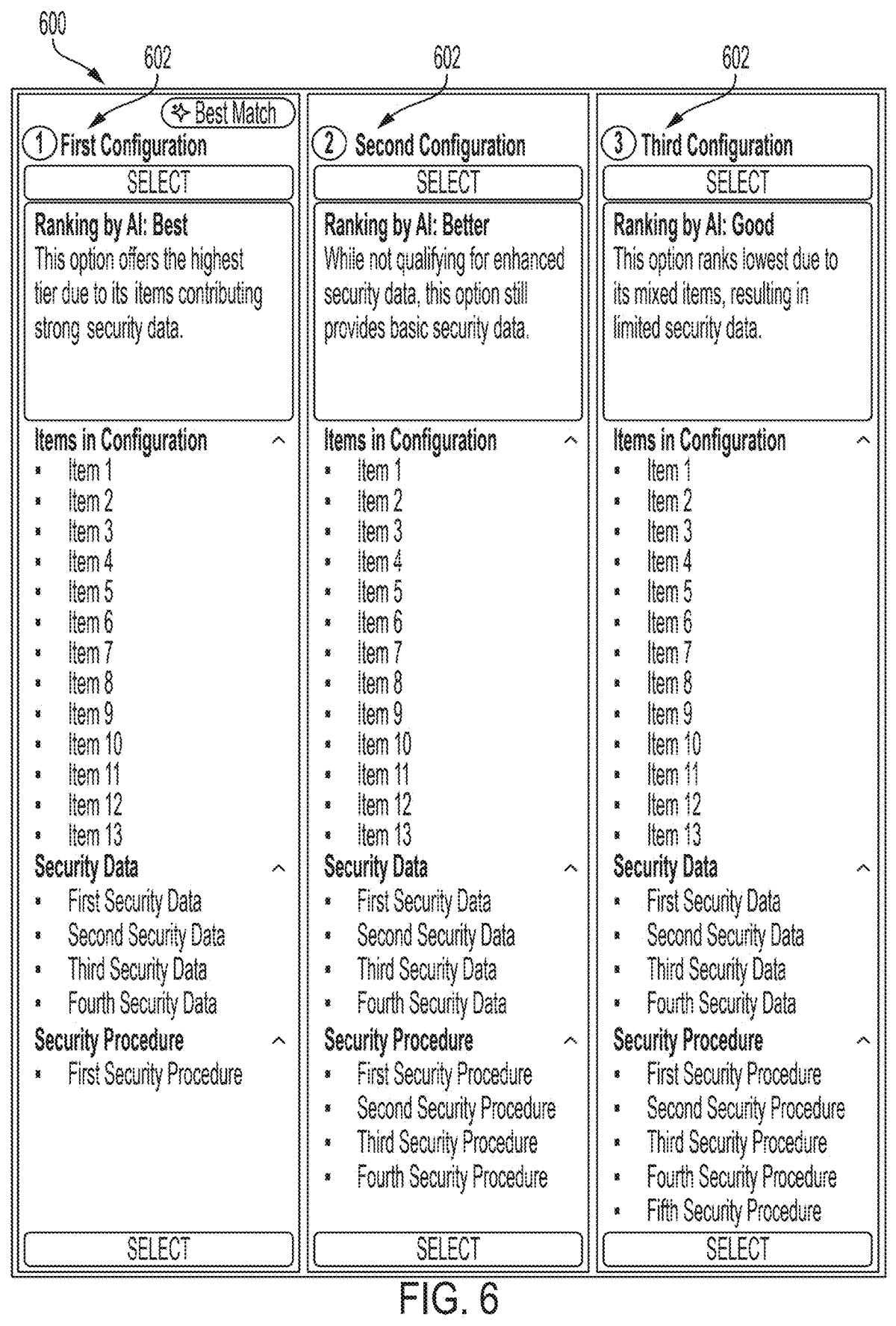

600

602           602           602

✧ Best Match

① First Configuration

SELECT

Ranking by AI: Best
This option offers the highest tier due to its items contributing strong security data.

Items in Configuration ⌃
- Item 1
- Item 2
- Item 3
- Item 4
- Item 5
- Item 6
- Item 7
- Item 8
- Item 9
- Item 10
- Item 11
- Item 12
- Item 13

Security Data ⌃
- First Security Data
- Second Security Data
- Third Security Data
- Fourth Security Data

Security Procedure ⌃
- First Security Procedure

SELECT

② Second Configuration

SELECT

Ranking by AI: Better
While not qualifying for enhanced security data, this option still provides basic security data.

Items in Configuration ⌃
- Item 1
- Item 2
- Item 3
- Item 4
- Item 5
- Item 6
- Item 7
- Item 8
- Item 9
- Item 10
- Item 11
- Item 12
- Item 13

Security Data ⌃
- First Security Data
- Second Security Data
- Third Security Data
- Fourth Security Data

Security Procedure ⌃
- First Security Procedure
- Second Security Procedure
- Third Security Procedure
- Fourth Security Procedure

SELECT

③ Third Configuration

SELECT

Ranking by AI: Good
This option ranks lowest due to its mixed items, resulting in limited security data.

Items in Configuration ⌃
- Item 1
- Item 2
- Item 3
- Item 4
- Item 5
- Item 6
- Item 7
- Item 8
- Item 9
- Item 10
- Item 11
- Item 12
- Item 13

Security Data ⌃
- First Security Data
- Second Security Data
- Third Security Data
- Fourth Security Data

Security Procedure ⌃
- First Security Procedure
- Second Security Procedure
- Third Security Procedure
- Fourth Security Procedure
- Fifth Security Procedure

SELECT

| 🔁 MY ORDER ⌄ | 👤 Patrick G ⌄ | 🔔 |

🏠 PRODUCTS ⌄ DELIVERIES  ORDERS  LOCATIONS  PROMOTIONS  WEATHER  TRAINING  INTEGRATIONS  COMMERCIAL | 🖩

*Home* > *Order Configurations* > Create Order Configuration

✏️ Create A New Configuration

New Configuration Name

☑ Is this configuration Option specific? ⓘ

☐ Is this configuration Quantity specific? ⓘ

Brief Description

Filter Items By

[ ⌄ ]

Job Account *(Please select to view pricing)*

[ ⌄ ]

| Material Costs (Required) | 🖩 | Labor (Optional) | Other Charges (Optional) | ⓘ |

| All Categories ⌄ | 🔍 *Enter Item Description* | BROWSE FULL CATALOG ▷ |

702

| Item Description | Option | Quantity | Default UOM | Waste Factor ⓘ | Measurement Factor ⓘ | Price | Remove |
|---|---|---|---|---|---|---|---|
| Item 1 📁 Category | | | EA ⌄ | 0 % | | | 🗑 |
| Item 2 📁 Category | | | EA ⌄ | 0 % | | | 🗑 |
| Item 3 📁 Category | | | EA ⌄ | 0 % | | | 🗑 |

| All Categories ⌄ | 🔍 *Enter Item Description* | BROWSE FULL CATALOG ▷ | + *Add Custom Item* |

704

[ PROCEED ]

CC Copy of Order to

*Email Address*

+ *Add Email*

Instructions To Branch

*Enter brief note*

[ SAVE CONFIGURATION ]

[ SAVE CONFIGURATION & CREATE ORDER ]

[ SAVE CONFIGURATION & CREATE ESTIMATE ]

[ CANCEL ]

✧ Project Health Check Results
Here's what we found for your project:   1102

⊙ Critical Issues

Item 1 does not meet code requirements in this ZIP code          *View item details*
Local building regulations require a different product specification. Check local codes before proceeding.
We suggest the following Products instead:

| Item 4 ▭ Category *Select this item instead* | Item 5 ▭ Category *Select this item instead* | REMOVE FROM ORDER 🗑 |

⊙ Warnings

Item 2 is missing code requirements          *View item details*
Your order is missing key components needed to qualify for code requirements.
We suggest the following Products instead:

| Item 6 ▭ Category *Select this item instead* | Item 7 ▭ Category *Select this item instead* | REMOVE FROM ORDER 🗑 |

Item 3 is missing, affecting eligibility for the security procedure          *View item details*
Your order is missing key components needed to qualify for the extended warranty.
We suggest the following Products instead:

| Item 8 ▭ Category *Select this item instead* | REMOVE FROM ORDER 🗑 |

🗨 Weather Alerts

🗨 90% chance of rain on September 30
Heavy rain is expected, which may impact installation and material storage.
*Reschedule Delivery* 🗓

1104

Close    ✧ RUN CHECK AGAIN    APPLY CHANGES TO MY ORDER

FIG. 11

Figure 14A:
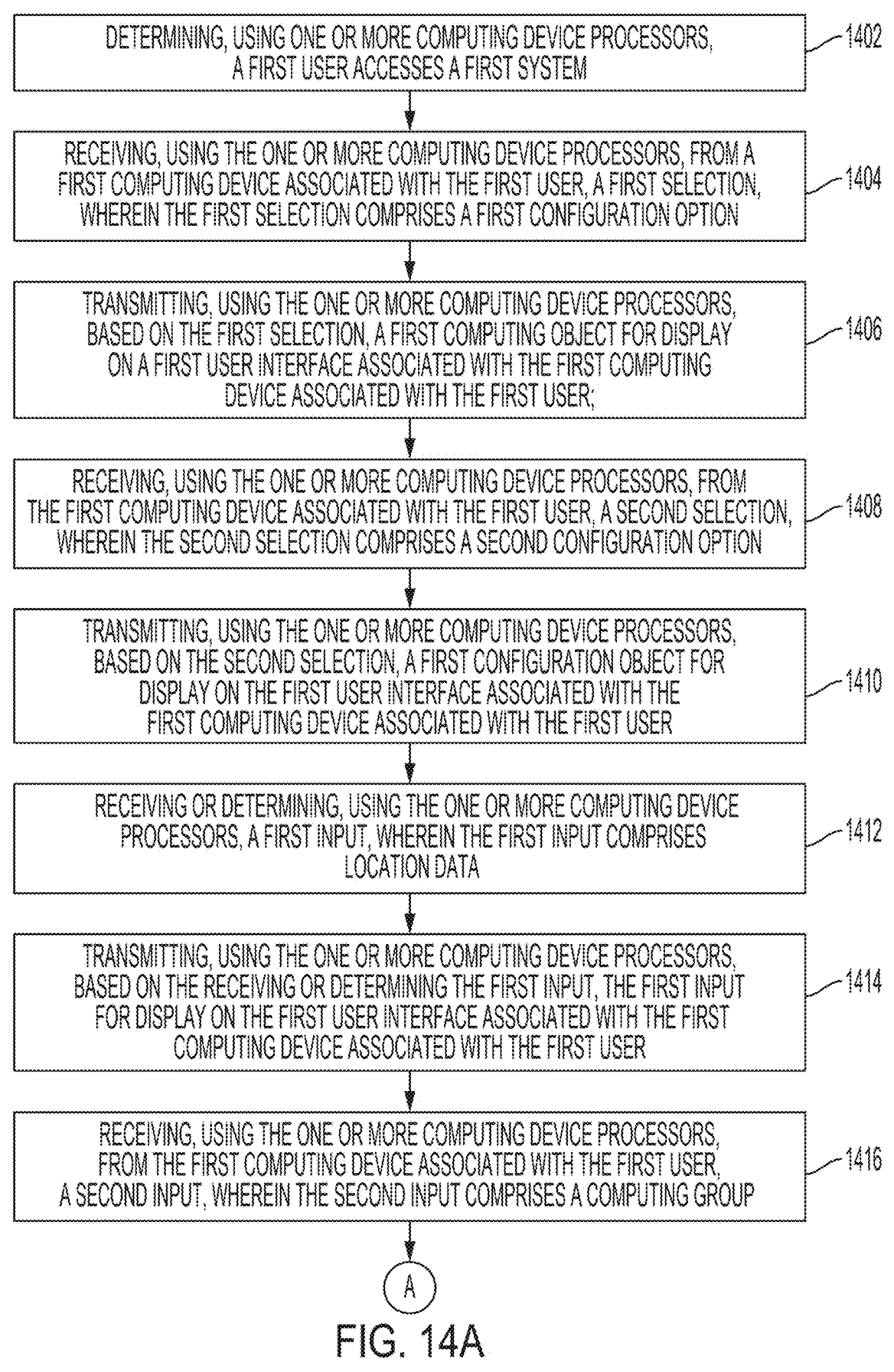

DETERMINING, USING ONE OR MORE COMPUTING DEVICE PROCESSORS, A FIRST USER ACCESSES A FIRST SYSTEM ⟋1402

RECEIVING, USING THE ONE OR MORE COMPUTING DEVICE PROCESSORS, FROM A FIRST COMPUTING DEVICE ASSOCIATED WITH THE FIRST USER, A FIRST SELECTION, WHEREIN THE FIRST SELECTION COMPRISES A FIRST CONFIGURATION OPTION ⟋1404

TRANSMITTING, USING THE ONE OR MORE COMPUTING DEVICE PROCESSORS, BASED ON THE FIRST SELECTION, A FIRST COMPUTING OBJECT FOR DISPLAY ON A FIRST USER INTERFACE ASSOCIATED WITH THE FIRST COMPUTING DEVICE ASSOCIATED WITH THE FIRST USER; ⟋1406

RECEIVING, USING THE ONE OR MORE COMPUTING DEVICE PROCESSORS, FROM THE FIRST COMPUTING DEVICE ASSOCIATED WITH THE FIRST USER, A SECOND SELECTION, WHEREIN THE SECOND SELECTION COMPRISES A SECOND CONFIGURATION OPTION ⟋1408

TRANSMITTING, USING THE ONE OR MORE COMPUTING DEVICE PROCESSORS, BASED ON THE SECOND SELECTION, A FIRST CONFIGURATION OBJECT FOR DISPLAY ON THE FIRST USER INTERFACE ASSOCIATED WITH THE FIRST COMPUTING DEVICE ASSOCIATED WITH THE FIRST USER ⟋1410

RECEIVING OR DETERMINING, USING THE ONE OR MORE COMPUTING DEVICE PROCESSORS, A FIRST INPUT, WHEREIN THE FIRST INPUT COMPRISES LOCATION DATA ⟋1412

TRANSMITTING, USING THE ONE OR MORE COMPUTING DEVICE PROCESSORS, BASED ON THE RECEIVING OR DETERMINING THE FIRST INPUT, THE FIRST INPUT FOR DISPLAY ON THE FIRST USER INTERFACE ASSOCIATED WITH THE FIRST COMPUTING DEVICE ASSOCIATED WITH THE FIRST USER ⟋1414

RECEIVING, USING THE ONE OR MORE COMPUTING DEVICE PROCESSORS, FROM THE FIRST COMPUTING DEVICE ASSOCIATED WITH THE FIRST USER, A SECOND INPUT, WHEREIN THE SECOND INPUT COMPRISES A COMPUTING GROUP ⟋1416

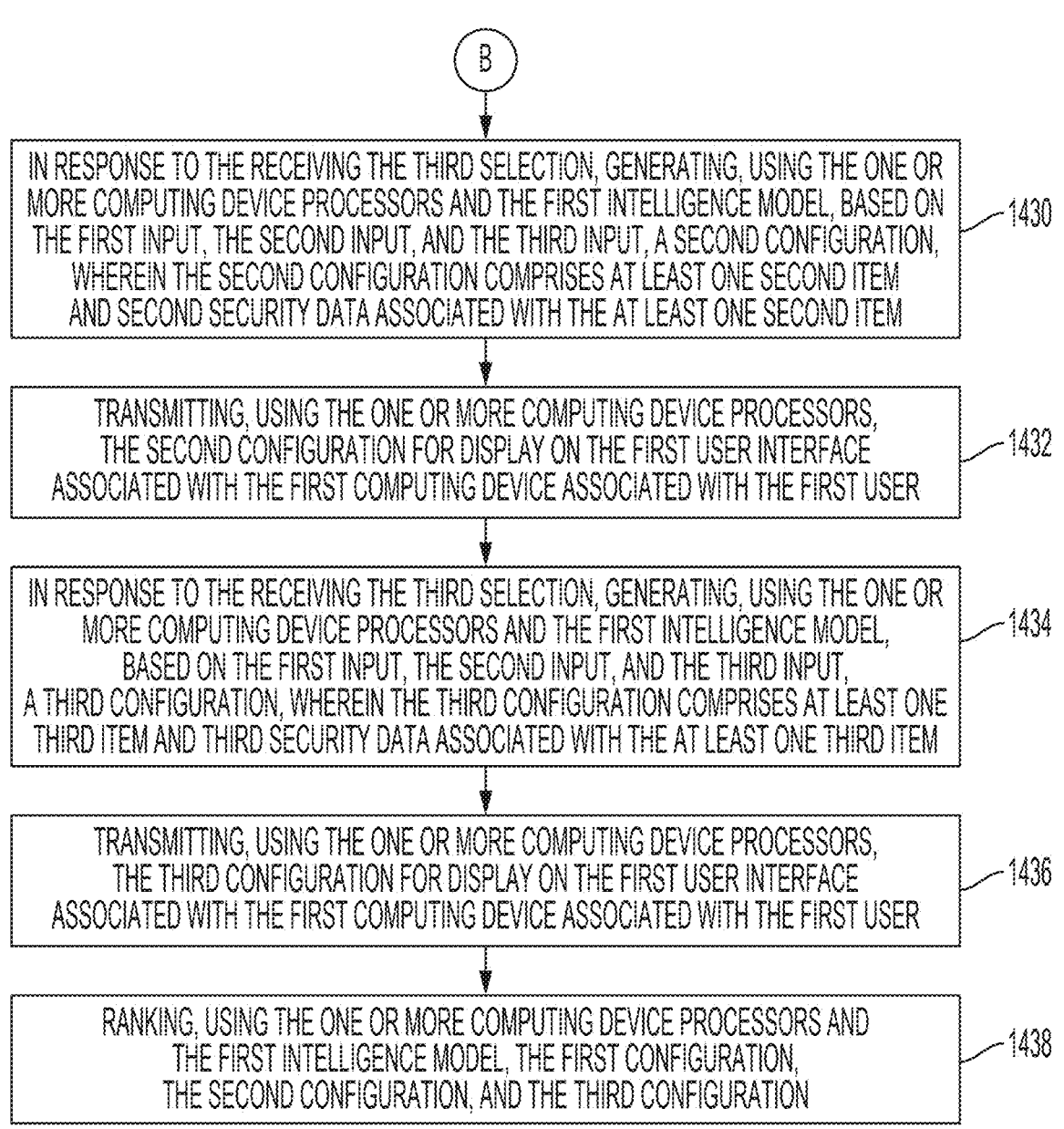

B

IN RESPONSE TO THE RECEIVING THE THIRD SELECTION, GENERATING, USING THE ONE OR MORE COMPUTING DEVICE PROCESSORS AND THE FIRST INTELLIGENCE MODEL, BASED ON THE FIRST INPUT, THE SECOND INPUT, AND THE THIRD INPUT, A SECOND CONFIGURATION, WHEREIN THE SECOND CONFIGURATION COMPRISES AT LEAST ONE SECOND ITEM AND SECOND SECURITY DATA ASSOCIATED WITH THE AT LEAST ONE SECOND ITEM — 1430

TRANSMITTING, USING THE ONE OR MORE COMPUTING DEVICE PROCESSORS, THE SECOND CONFIGURATION FOR DISPLAY ON THE FIRST USER INTERFACE ASSOCIATED WITH THE FIRST COMPUTING DEVICE ASSOCIATED WITH THE FIRST USER — 1432

IN RESPONSE TO THE RECEIVING THE THIRD SELECTION, GENERATING, USING THE ONE OR MORE COMPUTING DEVICE PROCESSORS AND THE FIRST INTELLIGENCE MODEL, BASED ON THE FIRST INPUT, THE SECOND INPUT, AND THE THIRD INPUT, A THIRD CONFIGURATION, WHEREIN THE THIRD CONFIGURATION COMPRISES AT LEAST ONE THIRD ITEM AND THIRD SECURITY DATA ASSOCIATED WITH THE AT LEAST ONE THIRD ITEM — 1434

TRANSMITTING, USING THE ONE OR MORE COMPUTING DEVICE PROCESSORS, THE THIRD CONFIGURATION FOR DISPLAY ON THE FIRST USER INTERFACE ASSOCIATED WITH THE FIRST COMPUTING DEVICE ASSOCIATED WITH THE FIRST USER — 1436

RANKING, USING THE ONE OR MORE COMPUTING DEVICE PROCESSORS AND THE FIRST INTELLIGENCE MODEL, THE FIRST CONFIGURATION, THE SECOND CONFIGURATION, AND THE THIRD CONFIGURATION — 1438

FIG. 14C

Figure 15A:
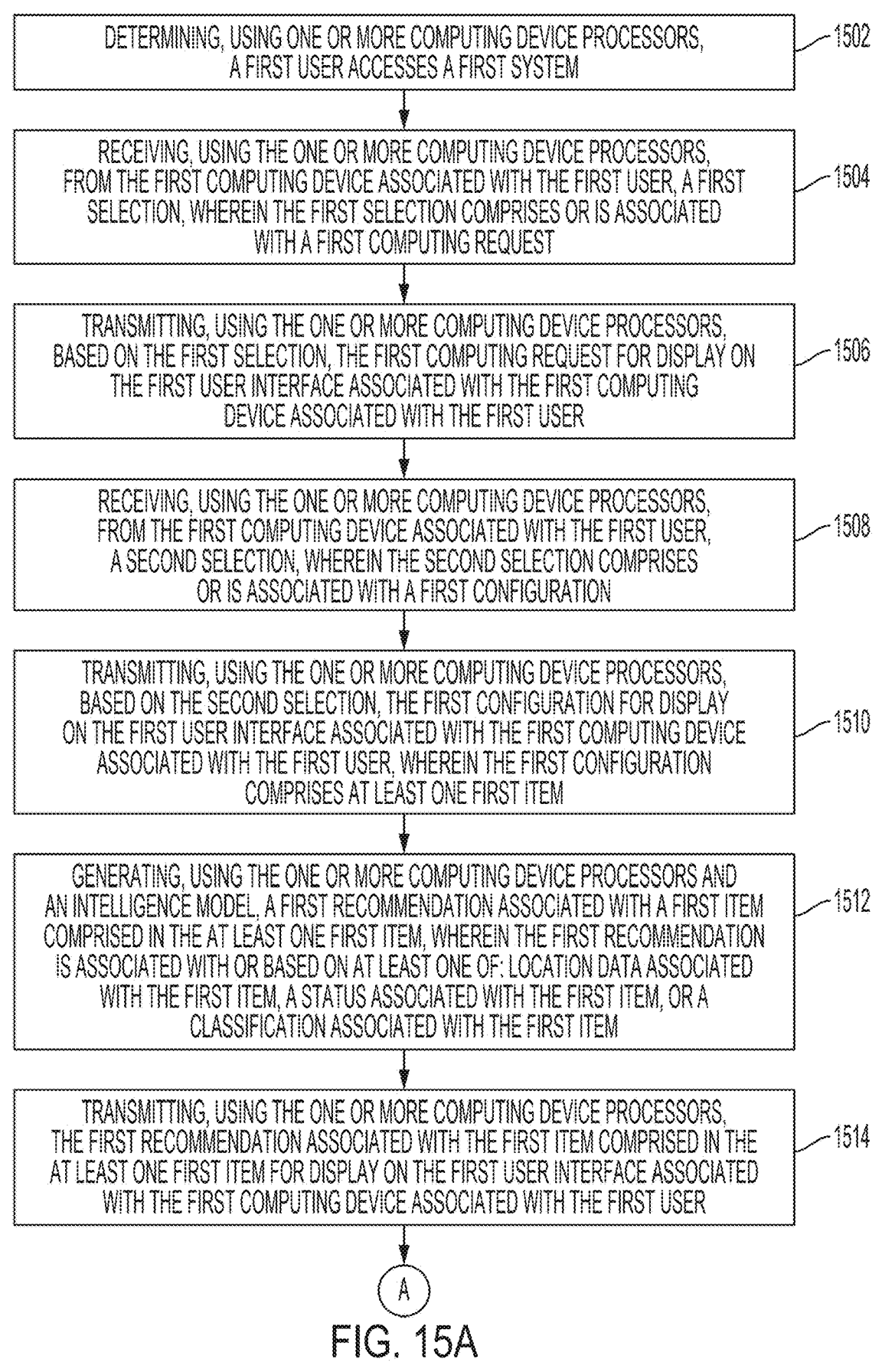

DETERMINING, USING ONE OR MORE COMPUTING DEVICE PROCESSORS, A FIRST USER ACCESSES A FIRST SYSTEM ⎯1502

RECEIVING, USING THE ONE OR MORE COMPUTING DEVICE PROCESSORS, FROM THE FIRST COMPUTING DEVICE ASSOCIATED WITH THE FIRST USER, A FIRST SELECTION, WHEREIN THE FIRST SELECTION COMPRISES OR IS ASSOCIATED WITH A FIRST COMPUTING REQUEST ⎯1504

TRANSMITTING, USING THE ONE OR MORE COMPUTING DEVICE PROCESSORS, BASED ON THE FIRST SELECTION, THE FIRST COMPUTING REQUEST FOR DISPLAY ON THE FIRST USER INTERFACE ASSOCIATED WITH THE FIRST COMPUTING DEVICE ASSOCIATED WITH THE FIRST USER ⎯1506

RECEIVING, USING THE ONE OR MORE COMPUTING DEVICE PROCESSORS, FROM THE FIRST COMPUTING DEVICE ASSOCIATED WITH THE FIRST USER, A SECOND SELECTION, WHEREIN THE SECOND SELECTION COMPRISES OR IS ASSOCIATED WITH A FIRST CONFIGURATION ⎯1508

TRANSMITTING, USING THE ONE OR MORE COMPUTING DEVICE PROCESSORS, BASED ON THE SECOND SELECTION, THE FIRST CONFIGURATION FOR DISPLAY ON THE FIRST USER INTERFACE ASSOCIATED WITH THE FIRST COMPUTING DEVICE ASSOCIATED WITH THE FIRST USER, WHEREIN THE FIRST CONFIGURATION COMPRISES AT LEAST ONE FIRST ITEM ⎯1510

GENERATING, USING THE ONE OR MORE COMPUTING DEVICE PROCESSORS AND AN INTELLIGENCE MODEL, A FIRST RECOMMENDATION ASSOCIATED WITH A FIRST ITEM COMPRISED IN THE AT LEAST ONE FIRST ITEM, WHEREIN THE FIRST RECOMMENDATION IS ASSOCIATED WITH OR BASED ON AT LEAST ONE OF: LOCATION DATA ASSOCIATED WITH THE FIRST ITEM, A STATUS ASSOCIATED WITH THE FIRST ITEM, OR A CLASSIFICATION ASSOCIATED WITH THE FIRST ITEM ⎯1512

TRANSMITTING, USING THE ONE OR MORE COMPUTING DEVICE PROCESSORS, THE FIRST RECOMMENDATION ASSOCIATED WITH THE FIRST ITEM COMPRISED IN THE AT LEAST ONE FIRST ITEM FOR DISPLAY ON THE FIRST USER INTERFACE ASSOCIATED WITH THE FIRST COMPUTING DEVICE ASSOCIATED WITH THE FIRST USER ⎯1514

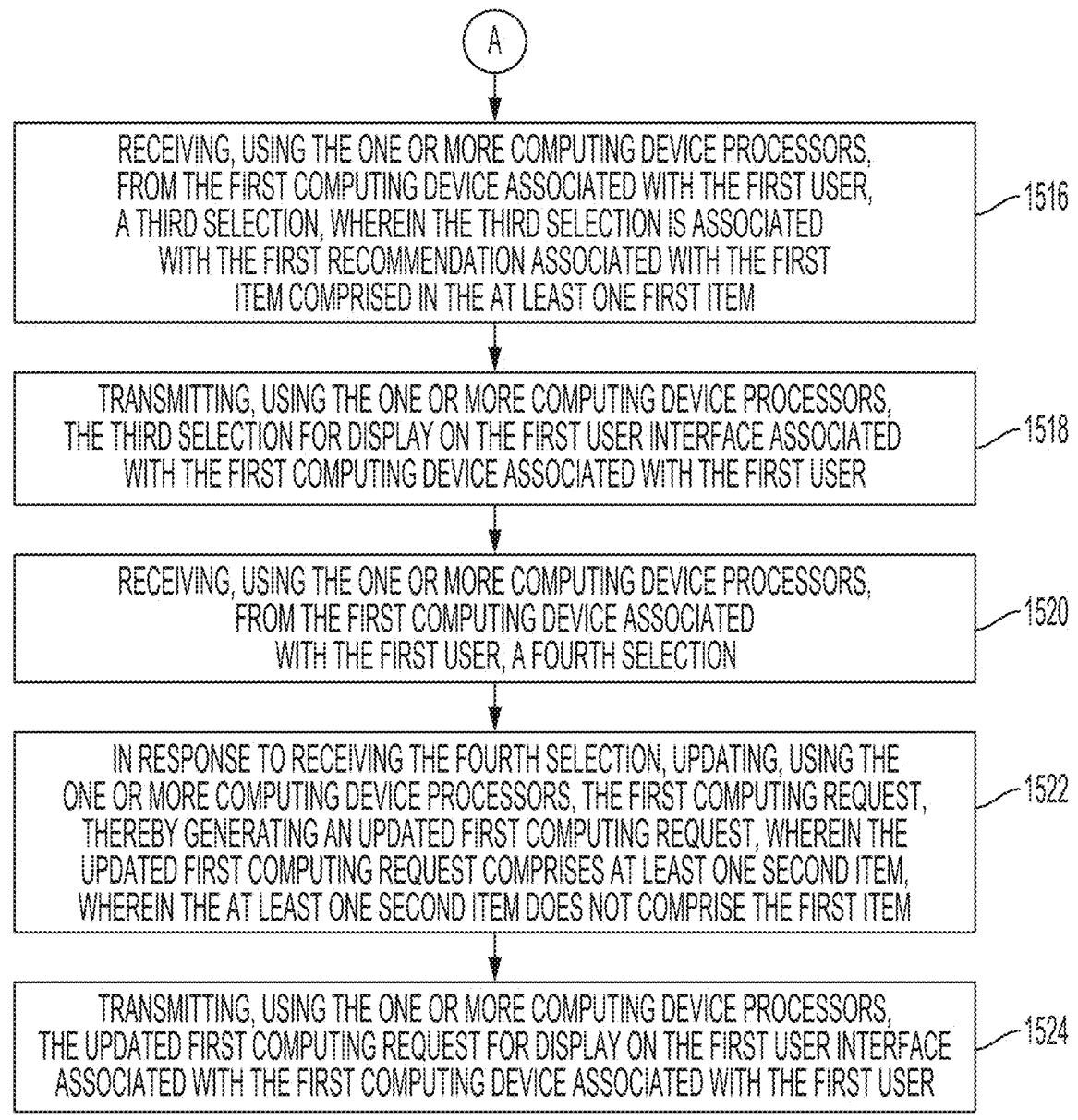

RECEIVING, USING THE ONE OR MORE COMPUTING DEVICE PROCESSORS, FROM THE FIRST COMPUTING DEVICE ASSOCIATED WITH THE FIRST USER, A THIRD SELECTION, WHEREIN THE THIRD SELECTION IS ASSOCIATED WITH THE FIRST RECOMMENDATION ASSOCIATED WITH THE FIRST ITEM COMPRISED IN THE AT LEAST ONE FIRST ITEM ⟋1516

TRANSMITTING, USING THE ONE OR MORE COMPUTING DEVICE PROCESSORS, THE THIRD SELECTION FOR DISPLAY ON THE FIRST USER INTERFACE ASSOCIATED WITH THE FIRST COMPUTING DEVICE ASSOCIATED WITH THE FIRST USER ⟋1518

RECEIVING, USING THE ONE OR MORE COMPUTING DEVICE PROCESSORS, FROM THE FIRST COMPUTING DEVICE ASSOCIATED WITH THE FIRST USER, A FOURTH SELECTION ⟋1520

IN RESPONSE TO RECEIVING THE FOURTH SELECTION, UPDATING, USING THE ONE OR MORE COMPUTING DEVICE PROCESSORS, THE FIRST COMPUTING REQUEST, THEREBY GENERATING AN UPDATED FIRST COMPUTING REQUEST, WHEREIN THE UPDATED FIRST COMPUTING REQUEST COMPRISES AT LEAST ONE SECOND ITEM, WHEREIN THE AT LEAST ONE SECOND ITEM DOES NOT COMPRISE THE FIRST ITEM ⟋1522

TRANSMITTING, USING THE ONE OR MORE COMPUTING DEVICE PROCESSORS, THE UPDATED FIRST COMPUTING REQUEST FOR DISPLAY ON THE FIRST USER INTERFACE ASSOCIATED WITH THE FIRST COMPUTING DEVICE ASSOCIATED WITH THE FIRST USER ⟋1524

FIG. 15B

METHODS AND APPARATUS FOR GENERATING AT LEAST ONE CONFIGURATION USING AN INTELLIGENCE MODEL IN A COMPUTING NETWORK

TECHNICAL FIELD

The present disclosure relates to intelligence models.

BACKGROUND

There is a need for a method for generating a configuration using an intelligence model in a computing network for various software applications.

SUMMARY

Disclosed are methods and systems for generating at least one configuration using an intelligence model in a computing network, the method comprising: determining, using one or more computing device processors, a first user accesses a first system; receiving, using the one or more computing device processors, from a first computing device associated with the first user, a first selection, wherein the first selection comprises a first configuration option; transmitting, using the one or more computing device processors, based on the first selection, a first computing object for display on a first user interface associated with the first computing device associated with the first user; receiving, using the one or more computing device processors, from the first computing device associated with the first user, a second selection, wherein the second selection comprises a second configuration option; transmitting, using the one or more computing device processors, based on the second selection, a first configuration object for display on the first user interface associated with the first computing device associated with the first user; determining or receiving, using the one or more computing device processors, a first input, wherein the first input comprises location data; transmitting, using the one or more computing device processors, based on the determining or receiving the first input, the first input for display on the first user interface associated with the first computing device associated with the first user; receiving, using the one or more computing device processors, from the first computing device associated with the first user, a second input, wherein the second input comprises a computing group; transmitting, using the one or more computing device processors, based on the receiving the second input, the second input for display on the first user interface associated with the first computing device associated with the first user; receiving, using the one or more computing device processors, from the first computing device associated with the first user, a third input, wherein the third input comprises at least one customization selection; transmitting, using the one or more computing device processors, based on the receiving the third input, the third input for display on the first user interface associated with the first computing device associated with the first user; receiving, using the one or more computing device processors, from the first computing device associated with the first user, a third selection; in response to the receiving the third selection, generating, using the one or more computing device processors and a first intelligence model, based on the first input, the second input, and the third input, a first configuration, wherein the first configuration comprises at least one first item and first security data associated with the at least one first item;

transmitting, using the one or more computing device processors, the first configuration for display on the first user interface associated with the first computing device associated with the first user; in response to the receiving the third selection, generating, using the one or more computing device processors and the first intelligence model, based on the first input, the second input, and the third input, a second configuration, wherein the second configuration comprises at least one second item and second security data associated with the at least one second item; transmitting, using the one or more computing device processors, the second configuration for display on the first user interface associated with the first computing device associated with the first user; in response to the receiving the third selection, generating, using the one or more computing device processors and the first intelligence model, based on the first input, the second input, and the third input, a third configuration, wherein the third configuration comprises at least one third item and third security data associated with the at least one third item; transmitting, using the one or more computing device processors, the third configuration for display on the first user interface associated with the first computing device associated with the first user; and ranking, using the one or more computing device processors and the first intelligence model, the first configuration, the second configuration, and the third configuration.

In some embodiments, the method further comprises receiving, using the one or more computing device processors, from the first computing device associated with the first user, a fourth input, wherein the fourth input comprises a classifier associated with the first user.

Furthermore, in some cases, at least one of: the generating, based on the first input, the second input, and the third input, the first configuration is further based on the fourth input, the generating, based on the first input, the second input, and the third input, the second configuration is further based on the fourth input, the generating, based on the first input, the second input, and the third input, the third configuration is further based on the fourth input, or the classifier associated with the first user comprises or is associated with a position type or designation associated with the first user.

According to one embodiment, the at least one customization selection comprises at least one of: an optimization selection, a warranty optimization selection, or a standard certification level selection.

In another embodiment, the location data comprises at least one of: store data, branch data, an address, a city, a state, or an area code.

According to yet another embodiment, the computing group comprises at least one of: a manufacturer, a producer, a provider, a distributor, a company, or a business.

In other embodiments, the one or more computing device processors are comprised in one or more computing systems, wherein the one or more computing systems are located in one or more locations.

In some cases, an apparatus may perform a method for generating at least one configuration using an intelligence model in a computing network.

According to some embodiments, the intelligence model is hosted on a third-party server.

In other embodiments, the intelligence model is hosted on a local server.

In one embodiment, at least one of: the first configuration is associated with supplying the at least one first item to the first user, or the first configuration comprises a template.

According to another embodiment, at least one of: the first security data is associated with the at least one customization selection, or the first security data comprises or is associated with warranty data associated with the at least one first item.

In yet another embodiment, the rank the first configuration, the second configuration, and the third configuration is based on at least one of: the first security data, the second security data, or the third security data.

According to still another embodiment, the apparatus comprises or is comprised in one or more computing systems associated with one or more locations.

In other cases, a method for generating at least one configuration using an intelligence model comprises: determining, using one or more computing device processors, a first user accesses a first system; receiving, using the one or more computing device processors, from a first computing device associated with the first user, a first selection, wherein the first selection comprises a first configuration option; transmitting, using the one or more computing device processors, based on the first selection, a first computing object for display on a first user interface associated with the first computing device associated with the first user; receiving, using the one or more computing device processors, from the first computing device associated with the first user, a second selection, wherein the second selection comprises a second configuration option; transmitting, using the one or more computing device processors, based on the second selection, a first configuration object for display on the first user interface associated with the first computing device associated with the first user; determining or receiving, using the one or more computing device processors, a first input, wherein the first input comprises location data; transmitting, using the one or more computing device processors, based on the determining or receiving the first input, the first input for display on the first user interface associated with the first computing device associated with the first user; receiving, using the one or more computing device processors, from the first computing device associated with the first user, a second input, wherein the second input comprises a computing group; transmitting, using the one or more computing device processors, based on the receiving the second input, the second input for display on the first user interface associated with the first computing device associated with the first user; receiving, using the one or more computing device processors, from the first computing device associated with the first user, a third input, wherein the third input comprises at least one customization selection; transmitting, using the one or more computing device processors, based on the receiving the third input, the third input for display on the first user interface associated with the first computing device associated with the first user; receiving, using the one or more computing device processors, from the first computing device associated with the first user, a third selection; in response to the receiving the third selection, generating, using the one or more computing device processors and a first intelligence model, based on the first input, the second input, and the third input, a first configuration, wherein the first configuration comprises at least one first item; transmitting, using the one or more computing device processors, the first configuration for display on the first user interface associated with the first computing device associated with the first user; in response to the receiving the third selection, generating, using the one or more computing device processors and the first intelligence model, based on the first input, the second input, and the third input, a second configuration, wherein the second configuration comprises at least one second item; transmitting, using the one or more computing device processors, the second configuration for display on the first user interface associated with the first computing device associated with the first user; in response to the receiving the third selection, generating, using the one or more computing device processors and the first intelligence model, based on the first input, the second input, and the third input, a third configuration, wherein the third configuration comprises at least one third item; transmitting, using the one or more computing device processors, the third configuration for display on the first user interface associated with the first computing device associated with the first user; and ranking, using the one or more computing device processors and the first intelligence model, the first configuration, the second configuration, and the third configuration.

According to one embodiment, the method further comprises receiving, using the one or more computing device processors, from the first computing device associated with the first user, a fourth selection, wherein the fourth selection comprises the first configuration.

In some cases, the method further comprises: receiving, using the one or more computing device processors, from the first computing device associated with the first user, a fifth selection or a fourth input associated with a first item comprised in the at least one first item; and updating, based on the fifth selection or the fourth input associated with the first item comprised in the at least one first item, the first configuration.

In another embodiment, the method further comprises receiving, using the one or more computing device processors, from the first computing device associated with the first user, a fourth input, wherein the fourth input comprises an indicator associated with the first user.

Furthermore, according to some embodiments, at least one of: the generating, based on the first input, the second input, and the third input, the first configuration is further based on the fourth input, the generating, based on the first input, the second input, and the third input, the second configuration is further based on the fourth input, the generating, based on the first input, the second input, and the third input, the third configuration is further based on the fourth input, or the indicator associated with the first user comprises or is associated with a certification level or credentials associated with the first user.

According to other embodiments, the one or more computing device processors are comprised in one or more computing systems, wherein the one or more computing systems are located in one or more locations.

In another embodiment, an artificial intelligence assistant facilitates at least one of: the receiving the first input, the receiving the second input, or the receiving the third input.

Disclosed are methods and systems for updating a computing request using an intelligence model in a computing network, the method comprising: determining, using one or more computing device processors, a first user accesses a first system; receiving, using the one or more computing device processors, from a first computing device associated with the first user, a first selection, wherein the first selection comprises or is associated with a first computing request; transmitting, using the one or more computing device processors, based on the first selection, the first computing request for display on a first user interface associated with the first computing device associated with the first user; receiving, using the one or more computing device processors, from the first computing device associated with the first user, a second selection, wherein the second selection comprises or is associated with a first configuration; transmitting, using the one or more computing device processors, based on the second selection, the first configuration for display on the first user interface associated with the first computing device associated with the first user, wherein the first configuration comprises at least one first item; generating, using the one or more computing device processors and an intelligence model, a first recommendation associated with a first item comprised in the at least one first item, wherein the first recommendation is associated with or based on at least one of: first location data associated with the first item, a first status associated with the first item, or a first classification associated with the first item; transmitting, using the one or more computing device processors, the first recommendation associated with the first item comprised in the at least one first item for display on the first user interface associated with the first computing device associated with the first user; receiving, using the one or more computing device processors, from the first computing device associated with the first user, a third selection, wherein the third selection is associated with the first recommendation associated with the first item comprised in the at least one first item; transmitting, using the one or more computing device processors, the third selection for display on the first user interface associated with the first computing device associated with the first user; receiving, using the one or more computing device processors, from the first computing device associated with the first user, a fourth selection; in response to receiving the fourth selection, updating, using the one or more computing device processors, the first computing request, thereby generating an updated first computing request, wherein the updated first computing request comprises at least one second item, wherein the at least one second item does not comprise the first item; and transmitting, using the one or more computing device processors, the updated first computing request for display on the first user interface associated with the first computing device associated with the first user.

In some embodiments, the third selection comprises a second item, an option to remove the first item, or an option to search for a third item.

Furthermore, in some cases, the updated first computing request comprises at least one of: the second item, the third item, or an indicator associated with the first item, the second item, or the third item.

In other embodiments, the method further comprises: in response to receiving the fourth selection or a fifth selection, updating, using the one or more computing device processors, the first configuration, thereby generating an updated first configuration, wherein the updated first configuration comprises the at least one second item.

According to yet other embodiments, the first recommendation is associated with or based on a value associated with the first item.

In still other embodiments, the method further comprises: generating, using the one or more computing device processors and the intelligence model, a second recommendation associated with a second item comprised in the at least one first item, wherein the second recommendation is associated with or based on at least one of: second location data associated with the second item, a second status associated with the second item, a second classification associated with the second item, or a value associated with the second item; and transmitting, using the one or more computing device processors, the second recommendation associated with the second item comprised in the at least one first item for display on the first user interface associated with the first computing device associated with the first user.

Furthermore, in some cases, the third selection comprises a third item associated with the first recommendation associated with the first item comprised in the at least one first item, and a fourth item associated with the second recommendation associated with the second item comprised in the at least one first item, wherein the third selection comprises a third item.

In other cases, the first recommendation is associated with or based on at least one of: the first item comprising an inactive item, the first item comprising an out of stock item, the first item comprising an invalid item, the first item comprising a generic item, the first item comprising a frequently swapped item, the first item comprising a recently swapped item, the second item being associated with a first item type or first brand, the second item comprising a promotional item, or the second item comprising an on sale item.

According to one embodiment, the first user interface associated with the first computing device associated with the first user comprises at least one user interface associated with the first computing device associated with the first user.

In another embodiment, the one or more computing device processors are comprised in one or more computing systems, wherein the one or more computing systems are located in one or more locations.

According to yet another embodiment, an apparatus may perform a method for updating a computing request using an intelligence model in a computing network.

In some other embodiments, the first computing request comprises a first order.

According to other embodiments, the first configuration comprises a first template.

In some cases, the intelligence model is hosted on a third-party server.

In other cases, the intelligence model is hosted on a local server.

It is appreciated that the apparatus may comprise or be comprised in one or more computing systems associated with one or more locations.

According to another embodiment, a method for updating a computing request using an intelligence model in a computing network comprises: determining, using one or more computing device processors, a first user accesses a first system; receiving, using the one or more computing device processors, from a first computing device associated with the first user, a first selection, wherein the first selection comprises or is associated with a first computing request; transmitting, using the one or more computing device processors, based on the first selection, the first computing request for display on a first user interface associated with the first computing device associated with the first user; receiving, using the one or more computing device processors, from the first computing device associated with the first user, a second selection, wherein the second selection comprises or is associated with a first configuration; transmitting, using the one or more computing device processors, based on the second selection, the first configuration for display on the first user interface associated with the first computing device associated with the first user, wherein the first configuration comprises at least one first item; generating, using the one or more computing device processors and an intelligence model, a first recommendation associated with a first item comprised in the at least one first item, wherein the first recommendation is associated with or based on at least one of: first location data associated with the first item, a first status associated with the first item, or a first classification associated with the first item; transmitting, using the one or more computing device processors, the first recommendation associated with the first item comprised in the at least one first item for display on the first user interface associated with the first computing device associated with the first user, wherein the first recommendation comprises at least one second item; receiving, using the one or more computing device processors, from the first computing device associated with the first user, a third selection, wherein the third selection is associated with the first recommendation associated with the first item comprised in the at least one first item; transmitting, using the one or more computing device processors, the third selection for display on the first user interface associated with the first computing device associated with the first user; receiving, using the one or more computing device processors, from the first computing device associated with the first user, a fourth selection; in response to receiving the fourth selection, updating, using the one or more computing device processors, the first computing request, thereby generating an updated first computing request, wherein the updated first computing request comprises at least one third item, wherein the at least one third item does not comprise the first item; and transmitting, using the one or more computing device processors, the updated first computing request for display on the first user interface associated with the first computing device associated with the first user.

In some embodiments, the method further comprises: in response to receiving the fourth selection or a fifth selection, updating, using the one or more computing device processors, the first configuration, thereby generating an updated first configuration, wherein the updated first configuration comprises the at least one third item.

According to other embodiments, the third selection comprises a second item comprised in the at least one second item, an option to remove the first item, or an option to search for a third item.

Furthermore, in some cases, the at least one second item is ranked or ordered.

In yet other embodiments, the one or more computing device processors are comprised in one or more computing systems, wherein the one or more computing systems are located in one or more locations.

It is appreciated that, according to one embodiment, the first recommendation is associated with a severity indicator.

In another embodiment, the first recommendation is associated with at least one of: a first security indicator associated with an issue or an exception, wherein the issue or the exception prevents the first computing request from being placed, a second security indicator associated with a warning, wherein the warning does not prevent the first computing request from being placed, or a third security indicator associated with an alert, wherein the alert is associated with first computing request data.

Disclosed are methods and systems for analyzing a computing request using an intelligence model in a computing network, the method comprising: determining, using one or more computing device processors, a first user accesses a first system; receiving, using the one or more computing device processors, from a first computing device associated with the first user, a first selection, wherein the first selection comprises a first computing request option; transmitting, using the one or more computing device processors, based on the first selection, a first computing request for display on a first user interface associated with the first computing device associated with the first user, wherein the first computing request comprises at least one item, wherein the first computing request comprises or is associated with first computing request data; receiving, using the one or more computing device processors, from the first computing device associated with the first user, a second selection, wherein the second selection comprises an analysis option associated with the first computing request; analyzing, using the one or more computing device processors and an intelligence model, the first computing request; generating, using the one or more computing device processors, based on the analyzing the first computing request, at least one analysis result associated with the first computing request, wherein the at least one analysis result is based on or associated with at least one of: an issue associated with a first item comprised in the at least one item, a warning associated with the first item or a second item comprised in the at least one item, a recommendation associated with the at least one item or the first computing request data, or an alert associated with the first computing request data; transmitting, using the one or more computing device processors, the at least one analysis result for display on the first user interface associated with the first computing device associated with the first user; receiving, using the one or more computing device processors, from the first computing device associated with the first user, a third selection, wherein the third selection is associated with the at least one analysis result; transmitting, using the one or more computing device processors, the third selection for display on the first user interface associated with the first computing device associated with the first user; receiving, using the one or more computing device processors, from the first computing device associated with the first user, a fourth selection; in response to receiving the fourth selection, updating, using the one or more computing device processors, the first computing request, thereby generating an updated first computing request; and transmitting, using the one or more computing device processors, the updated first computing request for display on the first user interface associated with the first computing device associated with the first user.

Disclosed are methods and systems for generating at least one recommendation associated with a computing request using an intelligence model in a computing network, the method comprising: determining, using one or more computing device processors, a first user accesses a first system; receiving, using the one or more computing device processors, from a first computing device associated with the first user, a first selection, wherein the first selection comprises a first computing request option; transmitting, using the one or more computing device processors, based on the first selection, a computing request for display on a first user interface associated with the first computing device associated with the first user; receiving, using the one or more computing device processors, from the first computing device associated with the first user, a first input, wherein the first input comprises at least one first item; updating, using the one or more computing device processors, based on the first input, the computing request, thereby generating a first updated computing request, wherein the updating the computing request comprises adding the at least one first item to the computing request; transmitting, using the one or more computing device processors, based on the first input, the first updated computing request comprising the at least one first item for display on the first user interface associated with the first computing device associated with the first user; generating, using the one or more computing device processors and an intelligence model, at least one recommendation associated with the first updated computing request, wherein the at least one recommendation comprises or is associated with at least one second item; transmitting, using the one or more computing device processors, the at least one recommendation associated with the first updated computing request for display on the first user interface associated with the first computing device associated with the first user; receiving, using the one or more computing device processors, from the first computing device associated with the first user, a second selection, wherein the second selection is associated with the at least one recommendation associated with the first updated computing request; updating, using the one or more computing device processors, based on the second selection, the first updated computing request, thereby generating a second updated computing request, wherein the second updated computing request comprises the at least one first item and the at least one second item; and transmitting, using the one or more computing device processors, the second updated computing request for display on the first user interface associated with the first computing device associated with the first user.

Disclosed are methods and systems for generating a computing request using a configuration in a computing network, the method comprising: determining, using one or more computing device processors, a first user accesses a first system; receiving, using the one or more computing device processors, from a first computing device associated with the first user, a first selection, wherein the first selection comprises a computing request option; transmitting, using the one or more computing device processors, based on the first selection, a first computing object for display on a first user interface associated with the first computing device associated with the first user; receiving, using the one or more computing device processors, from the first computing device associated with the first user, a second selection, wherein the second selection comprises a configuration option; transmitting, using the one or more computing device processors, based on the second selection, a first configuration object for display on the first user interface associated with the first computing device associated with the first user; determining or receiving, using the one or more computing device processors, a first input, wherein the first input comprises location data; transmitting, using the one or more computing device processors, based on the determining or receiving the first input, the first input for display on the first user interface associated with the first computing device associated with the first user; receiving, using the one or more computing device processors, from the first computing device associated with the first user, a second input, wherein the second input comprises a computing group; transmitting, using the one or more computing device processors, based on the receiving the second input, the second input for display on the first user interface associated with the first computing device associated with the first user; receiving, using the one or more computing device processors, from the first computing device associated with the first user, a third input, wherein the third input comprises at least one customization selection; transmitting, using the one or more computing device processors, based on the receiving the third input, the third input for display on the first user interface associated with the first computing device associated with the first user; receiving, using the one or more computing device processors, from the first computing device associated with the first user, a third selection; in response to the receiving the third selection, generating, using the one or more computing device processors and a first intelligence model, based on the first input, the second input, and the third input, a first configuration, wherein the first configuration comprises at least one first item and first security data associated with the at least one first item;

transmitting, using the one or more computing device processors, the first configuration for display on the first user interface associated with the first computing device associated with the first user; in response to the receiving the third selection, generating, using the one or more computing device processors and the first intelligence model, based on the first input, the second input, and the third input, a second configuration, wherein the second configuration comprises at least one second item and second security data associated with the at least one second item; transmitting, using the one or more computing device processors, the second configuration for display on the first user interface associated with the first computing device associated with the first user; in response to the receiving the third selection, generating, using the one or more computing device processors and the first intelligence model, based on the first input, the second input, and the third input, a third configuration, wherein the third configuration comprises at least one third item and third security data associated with the at least one third item; transmitting, using the one or more computing device processors, the third configuration for display on the first user interface associated with the first computing device associated with the first user; ranking, using the one or more computing device processors and the first intelligence model, the first configuration, the second configuration, and the third configuration; receiving, using the one or more computing device processors, from the first computing device associated with the first user, a fourth selection, wherein the fourth selection comprises the first configuration, the second configuration or the third configuration; and generating, using the one or more computing device processors, based on the fourth selection, a computing request.

BRIEF DESCRIPTION OF THE DRAWINGS

The disclosure is illustrated by way of example, and not by way of limitation in the figures of the accompanying drawings in which like reference numerals are used to refer to similar elements. It is emphasized that various features may not be drawn to scale and the dimensions of various features may be arbitrarily increased or reduced for clarity of discussion. Further, some components may be omitted in certain figures for clarity of discussion.

FIGS. 4, 5, and 6 show example user interfaces to generate at least one configuration using an intelligence model in a computing network.

FIGS. 7, 8, and 9 show example user interfaces to update a computing request using an intelligence model in a computing network.

FIGS. 10 and 11 show example user interfaces to analyze a computing request using an intelligence model in a computing network.

FIGS. 14A, 14B, and 14C show exemplary flowcharts for methods, systems/apparatuses, and computer program products that generate at least one configuration using an intelligence model in a complex computing network such as the network of FIG. 1, in accordance with some embodiments of this disclosure.

FIGS. 15A and 15B show exemplary flowcharts for methods, systems/apparatuses, and computer program products that update a computing request using an intelligence model in a complex computing network such as the network of FIG. 1, in accordance with some embodiments of this disclosure.

Figure 1:
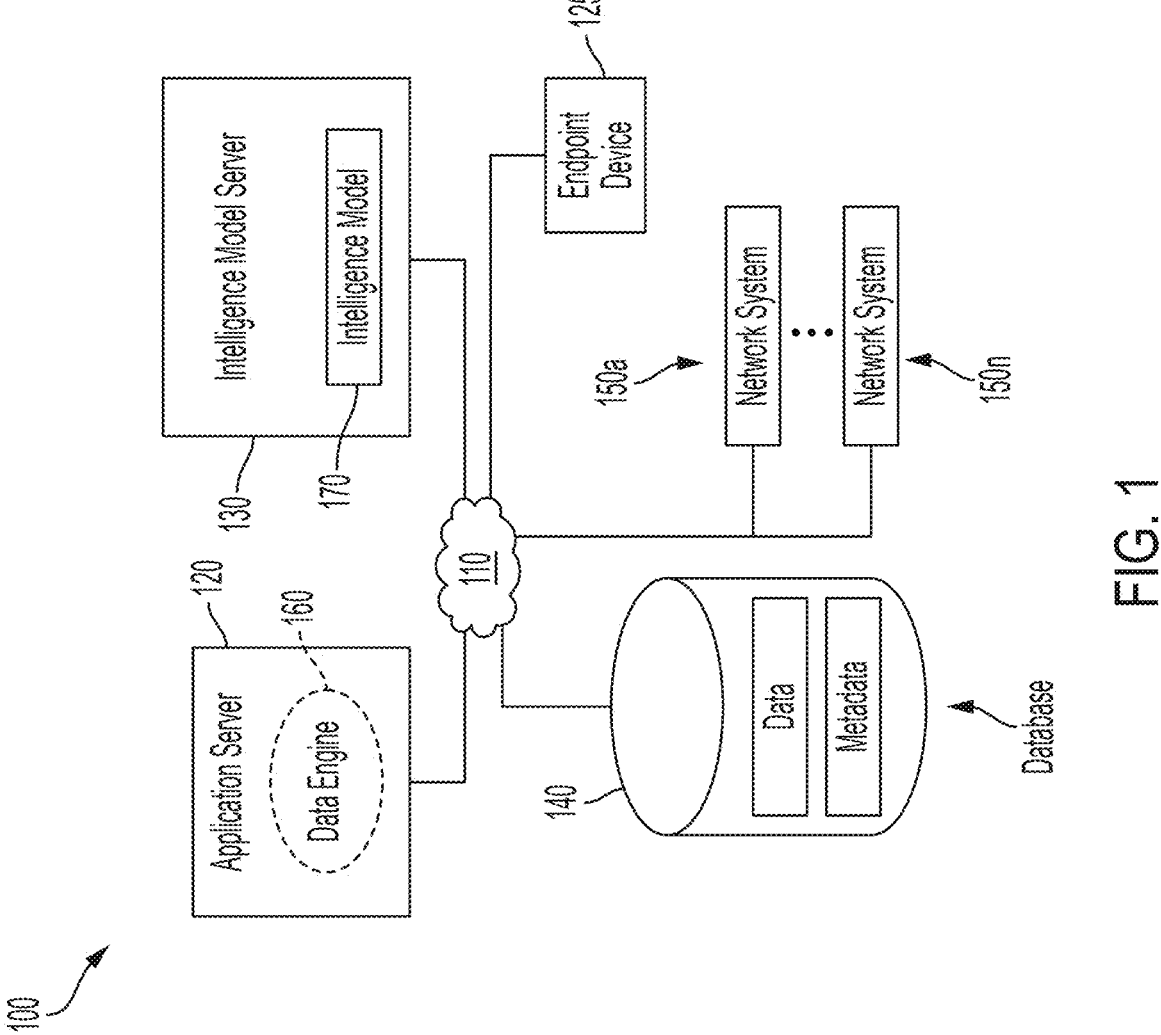
FIG. 1 is a high-level block diagram of a complex computing network for executing the principles disclosed.

All of these drawings are illustrations of certain embodiments. The scope of the claims is not limited to the specific embodiments illustrated in the drawings and described below.

DETAILED DESCRIPTION

System Environment

Illustrated in FIG. 1 is a high-level diagram of an exemplary system 100 for executing the principles disclosed. In the illustrated implementation, the system 100 may include an application server 120 communicatively coupled to a plurality of network systems 150a . . . 150n via a network 110. The system 100 may also include an intelligence model server 130, a database 140, and an endpoint device 125 communicatively coupled via the network 110. While a single intelligence model server 130, a single database 140, and a single endpoint device 125 are illustrated, the disclosed principles and techniques could be expanded to include multiple intelligence model servers, multiple databases, and multiple endpoint devices.

In some embodiments, the application server 120 may include a computing device such as a mainframe server, a content server, a communication server, a laptop computer, a desktop computer, a handheld computing device, a smart phone, a wearable computing device, a tablet computing device, a virtual machine, a mobile computing device, a cloud-based computing solution and/or a cloud-based service, and/or the like. The application server 120 may include a plurality of computing devices configured to communicate with one another and/or implement the techniques described herein.

Figure 2:
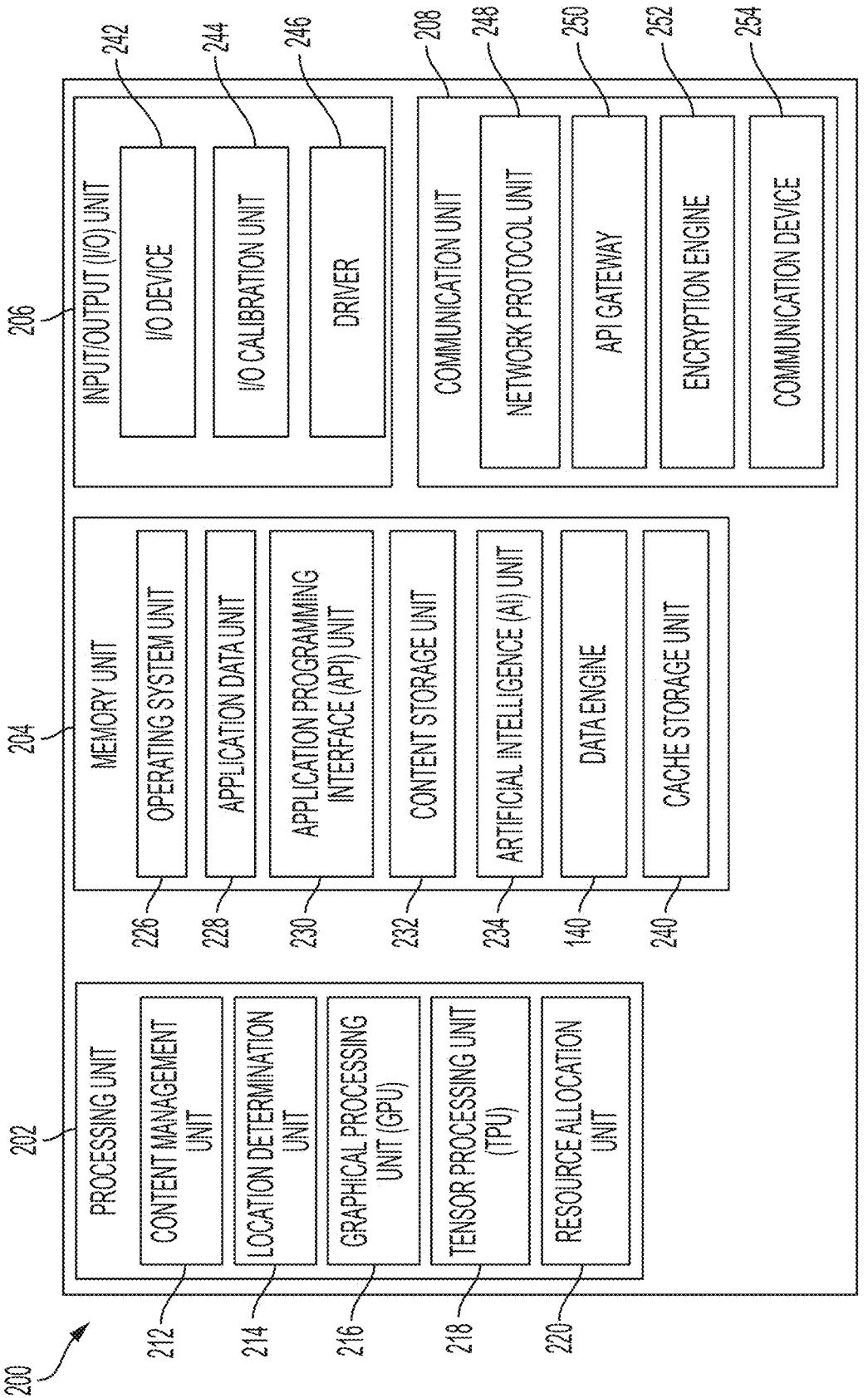
FIG. 2 is a functional block diagram of a complex computing environment associated with the disclosed techniques.
Figure 3:
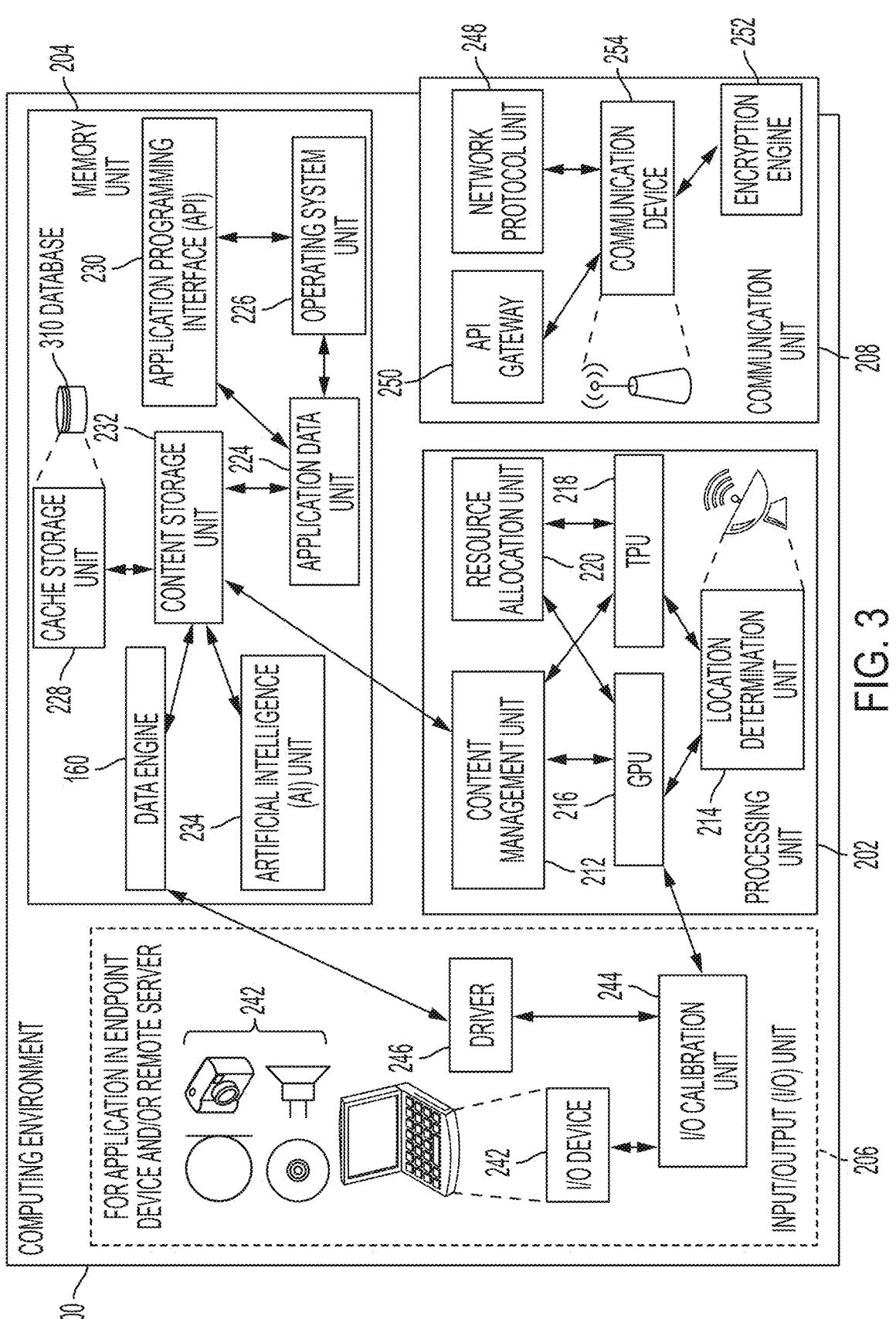
FIG. 3 is a detailed system diagram of the complex computing environment of FIG. 2.

The application server 120 may include various elements of a computing environment as described in association with the computing environment 200 of FIGS. 2 and 3. For example, the application server 120 may include processing unit 202, a memory unit 204, an input/output (I/O) unit 206, and/or a communication unit 208 which are discussed in association with FIGS. 2 and 3. The application server 120 may further include subunits and/or other modules for performing operations associated with generating a configuration using an intelligence model, updating a computing request using an intelligence model, analyzing a computing request using an intelligence model, generating at least one recommendation associated with a computing request using an intelligence model, and/or generating a computing request using a configuration. The application server 120 may be locally or remotely operated as the case may require.

Turning back to FIG. 1, the application server 120 may include a data engine 160. The data engine 160 may either be implemented on the application server 120 and/or on an endpoint device. The data engine 160 may include one or more instructions or computer logic that are executed by the one or more processors such as the processors discussed in association with FIGS. 2 and 3. In particular, the data engine 160 facilitates executing the processing procedures, methods, techniques, and workflows provided in this disclosure. Some embodiments include an iterative refinement of one or more data models (e.g., intelligence model, learning model, artificial intelligence model, large language model) associated with the network environment 100 disclosed via feedback loops executed by one or more computing device processors and/or through other control devices or mechanisms that make determinations regarding optimization of a given action, template, or model.

In some embodiments, the one or more data engines may access an operating system of a computing device comprised in the network environment 100 in order to execute the disclosed techniques. For instance, the one or more data engines may gain access into an operating system associated with the network environment 100 to initiate the various processes disclosed.

Turning back to FIG. 1, the endpoint device may be a handheld computing device, a smart phone, a tablet, a laptop computer, a desktop computer, a personal digital assistant (PDA), a smart device, a wearable device, a biometric device, a computer server, a virtual server, a virtual machine, a mobile device, and/or a communication server. In some embodiments, the endpoint device may include a plurality of computing devices configured to communicate with one another and/or implement the techniques described in this disclosure.

The other elements of the endpoint device are discussed in association with the computing environment 200 of FIGS. 2 and 3. For example, elements such as a processing unit 202, a memory unit 204, an input/output (I/O) unit 206, and/or a communication unit 208 may execute one or more of the modules of endpoint device shown in FIG. 1. The endpoint device may also include subunits and/or other computing instances as provided in this disclosure for performing operations associated with generating a configuration using an intelligence model, updating a computing request using an intelligence model, analyzing a computing request using an intelligence model, generating at least one recommendation associated with a computing request using an intelligence model, and/or generating a computing request using a configuration.

The network 110 may include a plurality of networks. For instance, the network 110 may include any wired and/or wireless communication network that facilitates communication between the application server 120, the endpoint device, the intelligence model server 130, the database 140, and the network systems 150a . . . 150n. The network 110, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, a 5G network, and/or the like.

The network systems 150a . . . 150n may include one or more computing devices or servers, services, or applications that can be accessed by application server 120 and/or the database 140 and/or the intelligence model server 130 and/or the endpoint device via the network 110. In one embodiment, the network systems 150a . . . 150n comprise third-party applications or services that are native or non-native to either the application server 120 and/or the intelligence model server 130 and/or the endpoint device. The third-party applications or services, for example, may facilitate receiving one or more user inputs and/or data and/or files. According to some implementations, the applications or services associated with the network systems 150a . . . 150n and/or associated with the application server 120, and/or the intelligence model server 130, and/or the database 140 and/or the endpoint device must be registered to activate or otherwise enable their usage in the network environment 100.

Returning to FIG. 1, the database 140 may comprise one or more storage devices that store data, information and instructions used by the application server 120 and/or the intelligence model server 130 and/or the endpoint device 125. The stored information may include information associated with metadata, information associated with a computing request, information associated with a configuration, information associated with an estimate, information associated with an item, information associated with a user history, etc. In one embodiment, the one or more storage devices mentioned above in association with the database 140 can be non-volatile memory or similar permanent storage device and media. For example, the one or more storage devices may include a hard disk drive, a CD-ROM device, a DVD-ROM device, a DVD-RAM device, a DVD-RW device, a flash memory device, solid state media, or some other mass storage device known in the art for storing information on a more permanent basis.

While the database 140 is shown as being coupled to the application server 120 and the intelligence model server 130 via the network 110, the data in the database 140 may be replicated, in some embodiments, on the application server 120 and/or the intelligence model server 130 and/or the endpoint device. That is to say that a local copy of the data in the database 140 may be stored on the application server 120 and/or the intelligence model server 130 and/or the endpoint device. This local copy may be synced with the database 140 so that when there are any changes to the information in the database 140, the local copy on either the application server 120 and/or the intelligence model server 130 and/or the endpoint device is also similarly updated or synced in real-time or in near-real-time to be consistent with the information in the database 140 and vice versa.

Turning back to FIG. 1, in some embodiments, the intelligence model server 130 may include a computing device such as a mainframe server, a content server, a communication server, a laptop computer, a desktop computer, a handheld computing device, a smart phone, a wearable computing device, a tablet computing device, a virtual machine, a mobile computing device, a cloud-based computing solution and/or a cloud-based service, and/or the like. The intelligence model server 130 may include a plurality of computing devices configured to communicate with one another and/or implement the techniques described herein.

The intelligence model server 130 may include various elements of a computing environment as described in association with the computing environment 200 of FIGS. 2 and 3. For example, the intelligence model server 130 may include processing unit 202, a memory unit 204, an input/output (I/O) unit 206, and/or a communication unit 208 which are discussed in association with FIGS. 2 and 3. The intelligence model server 130 may further include subunits and/or other modules for performing operations associated with generating a configuration using an intelligence model, updating a computing request using an intelligence model, analyzing a computing request using an intelligence model, generating at least one recommendation associated with a computing request using an intelligence model, and/or generating a computing request using a configuration. The intelligence model server 130 may be locally hosted. Additionally or alternatively, the intelligence model server 130 may be hosted by a third-party.

In some embodiments, the intelligence model server 130 may include an intelligence model 170 for generating configurations, computing requests, analysis results associated with configurations and/or computing requests, recommendations associated with configurations and/or computing requests, etc. The intelligence model 170 may be trained with at least one of: zero-shot learning, few-shot learning, and fine-tuning. In other embodiments, the intelligence model server 130 may be trained and/or prompt-tuned with data specific to an entity. According to yet other embodiments, the intelligence model server 130 may be trained and/or prompt-tuned only with the data specific to the entity. Additionally or alternatively, the intelligence model 170 may comprise at least one of: GPT-4, LLAMA-3, BLOOM, PaLM, GPT-3.5, BERT, Gemini, LaMDA, Perplexity, or Falcon. Additionally or alternatively, the intelligence model 170 may also include multiple intelligence models (e.g., separately trained intelligence models) and therefore may be configured to perform and/or execute multiple processes in parallel. In some embodiments, the intelligence model server 130 may include a special chipset for processing large numbers of complex operations in a reduced amount of time.

FIGS. 2 and 3 illustrate exemplary functional and system diagrams of a computing environment 200, according to some embodiments of this disclosure. Specifically, FIG. 2 provides a functional block diagram of the computing environment 200, whereas FIG. 3 provides a detailed system diagram of the computing environment 200.

As seen in FIGS. 2 and 3, the computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described in this disclosure. Additionally, each unit and/or subunit may be operatively and/or otherwise communicatively coupled with each other and to the network 110. The computing environment 200 may be implemented on general-purpose hardware and/or specifically-purposed hardware as the case may be. In particular, the computing environment 200 and any units and/or subunits of FIGS. 2 and 3 may be included in one or more elements of system 100 as described above.

The processing unit 202 may control one or more of the memory unit 204, the I/O unit 206, and the communication unit 208 of the computing environment 200, as well as any included subunits, elements, components, devices, and/or functions performed by the memory unit 204, I/O unit 206, and the communication unit 208. The described sub-elements of the computing environment 200 may also be included in similar fashion in any of the other units and/or devices included in the system 100 of FIG. 1. Additionally, any actions described herein as being performed by a processor may be taken by the processing unit 202 of FIGS. 2 and 3 alone and/or by the processing unit 202 in conjunction with one or more additional processors, units, subunits, elements, components, devices, and/or the like. Further, while one processing unit 202 may be shown in FIGS. 2 and 3, multiple processing units may be present and/or otherwise included in the computing environment 200 or elsewhere in the overall system (e.g., system 100 of FIG. 1). Thus, while instructions may be described as being executed by the processing unit 202 (and/or various subunits of the processing unit 202), the instructions may be executed simultaneously, serially, and/or otherwise by one or multiple processing units 202 on one or more devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices, and/or computing environments, and/or the like.

In some embodiments, the processing unit 202 may include, among other elements, subunits such as a content management unit 212, a location determination unit 214, a graphical processing unit (GPU) 216, a tensor processing unit (TPU) 218, and a resource allocation unit 220. Each of the aforementioned subunits of the processing unit 202 may be communicatively and/or otherwise operably coupled with each other.

The content management unit 212 may facilitate generation, modification, analysis, transmission, and/or presentation of content. Content may be file content, image content, exception event content, media content, security event content, tracking content, or any combination thereof. In some instances, content on which the content management unit 212 may operate includes device information, user interface data, image data, text data, themes, audio data or audio files, video data or video files, documents, and/or the like. Additionally, the content management unit 212 may control the audio-visual environment and/or appearance of application data during execution of various processes. In some embodiments, the content management unit 212 may interface with a third-party content server (e.g., third-party content server associated with the intelligence model server 130), and/or specific memory locations for execution of its operations.

The location determination unit 214 may facilitate detection, generation, modification, analysis, transmission, and/or presentation of location information. Location information may include global positioning system (GPS) coordinates, an internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information.

The GPU 216 may facilitate generation, modification, analysis, processing, transmission, and/or presentation of content described above, as well as any data (e.g., location data, security data, metadata, user data, etc.) described herein. In some embodiments, the GPU 216 may be utilized to render content for presentation on a computing device. In some embodiments, the GPU 216 may be utilized to perform computations associated with configurations, computing requests, estimates, etc. The GPU 216 may also include multiple GPUs and therefore may be configured to perform and/or execute multiple processes in parallel. In some implementations, the GPU 216 may be used in conjunction with the data engine 160, and/or the TPU 218 and/or other subunits associated with the memory unit 204, the I/O unit 206, the communication unit 208, and/or a combination thereof.

The TPU 218 may facilitate generation, modification, analysis, processing, transmission, and/or presentation of any configurations, computing requests, analysis results, recommendations, etc. described herein. In some embodiments, the TPU 218 may be utilized to perform computations comprising or based on configurations, computing requests, estimates, analysis results, recommendations, etc. The TPU 218 may also include multiple TPUs and therefore may be configured to perform and/or execute multiple processes in parallel. In some implementations, the TPU 218 may be used in conjunction with the data engine 160, and/or the GPU 216, and/or other subunits associated with the memory unit 204, the I/O unit 206, the communication unit 208, and/or a combination thereof. In some embodiments, the TPU 218 may interface with a third-party content server (e.g., third-party content server associated with the intelligence model server 130) for execution of its operations.

The resource allocation unit 220 may facilitate the determination, monitoring, analysis, and/or allocation of computing resources throughout the computing environment 200 and/or other computing environments. For example, the computing environment may facilitate a high volume of data (e.g., location data, metadata, item data, computing group data, user history data, etc.), to be processed and analyzed. As such, computing resources of the computing environment 200 used by the processing unit 202, the memory unit 204, the I/O unit 206, and/or the communication unit 208 (and/or any subunit of the aforementioned units) such as processing power, data storage space, network bandwidth, and/or the like may be in high demand at various times during operation of the computing environment 200. Accordingly, the resource allocation unit 220 may include sensors and/or other specially-purposed hardware for monitoring performance of each unit and/or subunit of the computing environment 200, as well as hardware for responding to the computing resource needs of each unit and/or subunit. In some embodiments, the resource allocation unit 220 may use computing resources of a second computing environment separate and distinct from the computing environment 200 to facilitate a desired operation. For example, the resource allocation unit 220 may determine a number of simultaneous computing processes and/or requests. The resource allocation unit 220 may also determine that the number of simultaneous computing processes and/or requests meet and/or exceed a predetermined threshold value. Based on this determination, the resource allocation unit 220 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 220 may then retrieve, transmit, control, allocate, and/or otherwise distribute determined amount(s) of computing resources to each element (e.g., unit and/or subunit) of the computing environment 200 and/or another computing environment.

The memory unit 204 may be used for storing, recalling, receiving, transmitting, and/or accessing various files and/or data (e.g., location data, metadata, item data, computing group data, user history data, etc.) during operation of computing environment 200. For example, memory unit 204 may be used for storing, recalling, and/or updating location data, metadata, item data, computing group data, and/or user history data, as well as other data associated with, resulting from, and/or generated by any unit, or combination of units and/or subunits of the computing environment 200. In some embodiments, the memory unit 204 may store instructions, code, and/or data that may be executed by the processing unit 202. For instance, the memory unit 204 may store code that execute operations associated with one or more units and/or one or more subunits of the computing environment 200. For example, the memory unit may store code for the processing unit 202, the I/O unit 206, the communication unit 208, and for itself.

Memory unit 204 may include various types of data storage media such as solid state storage media, hard disk storage media, virtual storage media, and/or the like. Memory unit 204 may include dedicated hardware elements such as hard drives and/or servers, as well as software elements such as cloud-based storage drives. In some implementations, memory unit 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing unit 202. For example, the instructions stored by the RAM device may be a command, a current operating state of computing environment 200, an intended operating state of computing environment 200, and/or the like. As a further example, data stored in the RAM device of memory unit 204 may include instructions related to various methods and/or functionalities described herein. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 may include one or more databases 310 (shown in FIG. 3) for storing any data described herein. For example, depending on the implementation, the one or more databases may be used as a local database of the network systems 150a . . . 150n discussed with reference to FIG. 1. Additionally or alternatively, one or more secondary databases (e.g., the database 140 discussed with reference to FIG. 1) located remotely from computing environment 200 may be used and/or accessed by memory unit 204. In some embodiments, memory unit 204 and/or its subunits may be local to the application server 120 and/or the endpoint device and/or the network systems 150a . . . 150n and/or remotely located in relation to the application server 120 and/or the endpoint device and/or the network systems 150a . . . 150n.

Turning back to FIG. 2, the memory unit 204 may include subunits such as an operating system unit 226, an application data unit 228, an application programming interface (API) unit 230, a content storage unit 232, an artificial intelligence (AI) unit 234, a data engine 160, and a cache storage unit 240. Each of the aforementioned subunits of the memory unit 204 may be communicatively and/or otherwise operably coupled with each other and other units and/or subunits of the computing environment 200. It is also noted that the memory unit 204 may include other modules, instructions, or code that facilitate the execution of the techniques described.

The operating system unit 226 may facilitate deployment, storage, access, execution, and/or utilization of an operating system utilized by computing environment 200 and/or any other computing environment described herein. In some embodiments, operating system unit 226 may include various hardware and/or software elements that serve as a structural framework for processing unit 202 to execute various operations described herein. Operating system unit 226 may further store various pieces of information and/or data associated with the operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application used by computing environment 200 and/or any other computing environment described herein. For example, the endpoint device may be required to download, install, access, and/or otherwise use a software application (e.g., web application) to facilitate performance of the disclosed techniques. As such, the application data unit 228 may store any information and/or data associated with an application. The application data unit 228 may further store various pieces of information and/or data associated with the operation of an application and/or computing environment 200 as a whole, such as status of computing resources (e.g., processing power, memory availability, resource utilization, and/or the like), runtime information, user interfaces, modules to direct execution of operations described herein, user permissions, security credentials, and/or the like.

The API unit 230 may facilitate deployment, storage, access, execution, and/or utilization of information associated with APIs of computing environment 200 and/or any other computing environment described herein. For example, computing environment 200 may include one or more APIs for various devices, applications, units, subunits, elements, and/or other computing environments to communicate with each other and/or utilize the same data. Accordingly, API unit 230 may include API databases containing information that may be accessed and/or utilized by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the application server 120, the endpoint device, and the network systems 150a . . . 150n to communicate with each other. It is appreciated that the API unit 230 may facilitate accessing, using the data engine 160, one or more applications or services on the application server 120 and/or the network systems 150a . . . 150n.

The content storage unit 232 may facilitate deployment, storage, access, and/or utilization of information associated with performance of implementing operations associated with the network environment 100 by computing environment 200 and/or any other computing environment described herein. In some embodiments, content storage unit 232 may communicate with content management unit 212 to receive and/or transmit content files (e.g., configuration content, item data content, metadata content, location data content, security data content, search result content, etc.).

The AI unit 234 may facilitate deployment, storage, access, execution, and/or utilization of information associated with the use of AI within the computing environment 200 and/or any other computing environment described herein. For example, the network environment 100 may utilize the AI unit 234 for configuration management, and/or troubleshooting, and/or network performance. In some embodiments, the intelligence model server 130 may utilize the AI unit 234 for generating configurations, recommendations, analysis results, data, text, content, etc. with the intelligence model 170.

As previously discussed, the data engine 160 facilitates executing the processing procedures, methods, techniques, and workflows provided in this disclosure. In particular, the data engine 160 may be configured to execute computing operations associated with the disclosed methods, systems/apparatuses, and computer program products.

The cache storage unit 240 may facilitate short-term deployment, storage, access, analysis, and/or utilization of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing the disclosed processes. For example, elements of the I/O unit 206 may be used to receive input from a user of the endpoint device. As described herein, I/O unit 206 may include subunits such as an I/O device 242, an I/O calibration unit 244, and/or driver 246.

The I/O device 242 may facilitate the receipt, transmission, processing, presentation, display, input, and/or output of information as a result of executed processes described herein. In some embodiments, I/O device 242 may include a plurality of I/O devices. In some embodiments, I/O device 242 may include a variety of elements that enable a user to interface with computing environment 200. For example, I/O device 242 may include a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, I/O device 242 may communicate with one or more elements of processing unit 202 and/or memory unit 204 to execute operations associated with the disclosed techniques and systems.

The I/O calibration unit 244 may facilitate the calibration of I/O device 242. For example, I/O calibration unit 244 may detect and/or determine one or more settings of I/O device 242, and then adjust and/or modify settings so that I/O device 242 may operate more efficiently. In some embodiments, I/O calibration unit 244 may use a driver 246 (or multiple drivers) to calibrate I/O device 242. For example, the driver 246 may include software that is to be installed by the I/O calibration unit 244 so that an element of computing environment 200 (or an element of another computing environment) may recognize and/or integrate with I/O device 242 for the processes described herein.

The communication unit 208 may facilitate establishment, maintenance, monitoring, and/or termination of communications between computing environment 200 and other computing environments, third-party server systems, and/or the like (e.g., between the application server 120 and the intelligence model server 130 and/or the endpoint device and/or the network systems 150a . . . 150n). Communication unit 208 may also facilitate internal communications between various elements (e.g., units and/or subunits) of computing environment 200. In some embodiments, communication unit 208 may include a network protocol unit 248, an API gateway 250, an encryption engine 252, and/or a communication device 254. Communication unit 208 may include hardware and/or other software elements.

The network protocol unit 248 may facilitate establishment, maintenance, and/or termination of a communication connection for computing environment 200 by way of a network. For example, the network protocol unit 248 may detect and/or define a communication protocol required by a particular network and/or network type. Communication protocols used by the network protocol unit 248 may include Wi-Fi protocols, Li-Fi protocols, cellular data network protocols, Bluetooth® protocols, WiMAX protocols, Ethernet protocols, powerline communication (PLC) protocols, mesh network protocols, 5G network protocols, and/or the like. In some embodiments, facilitation of communication for computing environment 200 may include transforming and/or translating data from being compatible with a first communication protocol to being compatible with a second communication protocol. In some embodiments, the network protocol unit 248 may determine and/or monitor an amount of data traffic to consequently determine which particular network protocol is to be used for establishing a secure communication connection, transmitting data, and/or performing malware scanning operations and/or other processes described herein.

The API gateway 250 may allow other devices and/or computing environments to access the API unit 230 of the memory unit 204 associated with the computing environment 200. For example, an endpoint device may access the API unit 230 of the computing environment 200 via the API gateway 250. In some embodiments, the API gateway 250 may be required to validate user credentials associated with a user of the endpoint device prior to providing access to the API unit 230 to a user. The API gateway 250 may include instructions for the computing environment 200 to communicate with another computing device and/or between elements of the computing environment 200.

The encryption engine 252 may facilitate translation, encryption, encoding, decryption, and/or decoding of information received, transmitted, and/or stored by the computing environment 200. Using encryption engine 252, each transmission of data may be encrypted, encoded, and/or translated for security reasons, and any received data may be encrypted, encoded, and/or translated prior to its processing and/or storage. In some embodiments, encryption engine 252 may generate an encryption key, an encoding key, a translation key, and/or the like, which may be transmitted along with any data content.

The communication device 254 may include a variety of hardware and/or software specifically purposed to facilitate communication for computing environment 200 and/or between two or more computing environments 200. In one embodiment, communication device 254 may include one or more radio transceivers, chips, analog front end (AFE) units, antennas, processing units, memory, other logic, and/or other components to implement communication protocols (wired or wireless) and related functionality for facilitating communication for computing environment 200. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or other transceiver devices used for communication purposes.

Exemplary Embodiments

FIGS. 4, 5, 6, and 7 show example user interfaces to generate at least one configuration using an intelligence model in a computing network.

Figure 4:
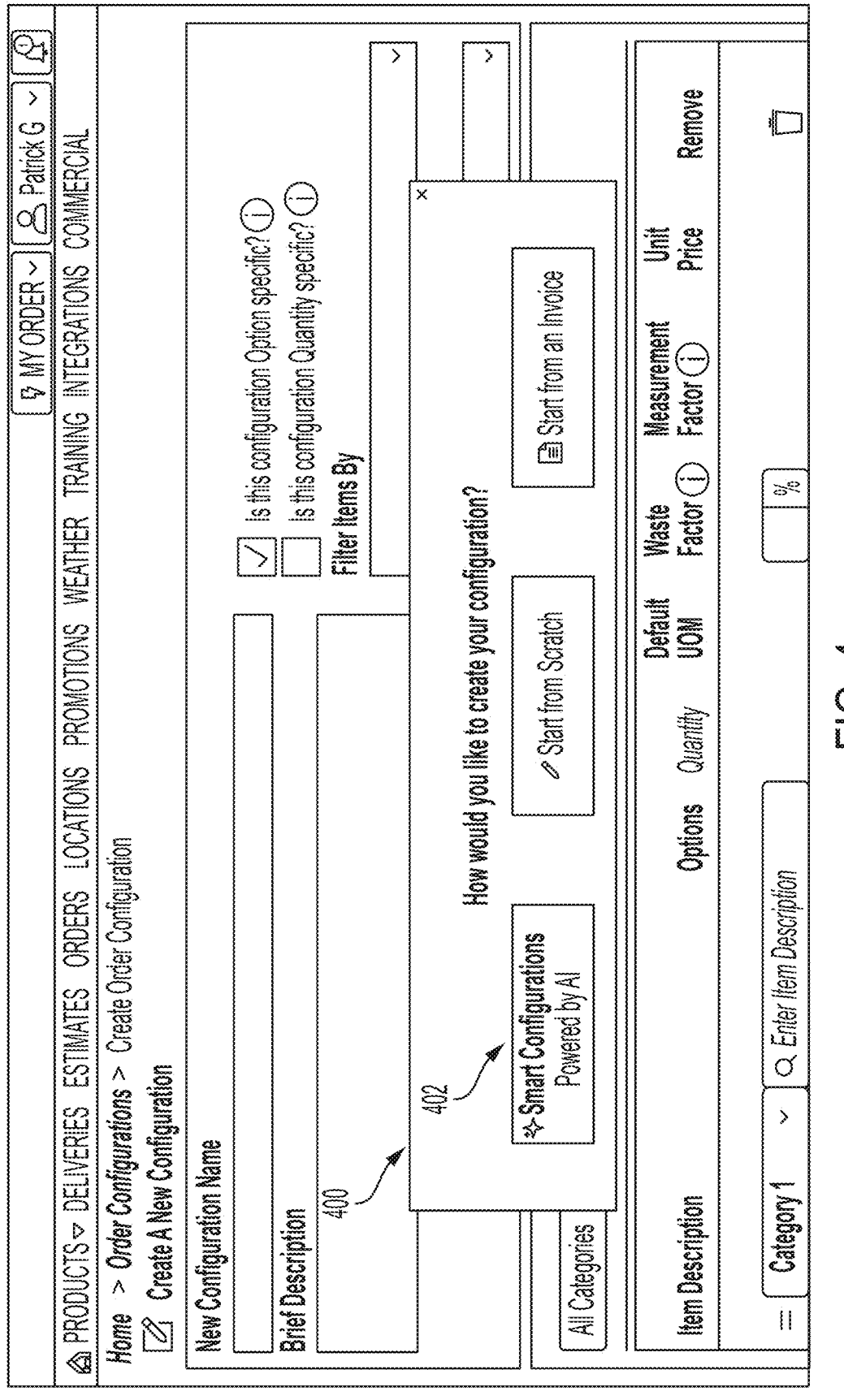

FIG. 4 shows an example new configuration user interface 400 for a first user within a system that generates at least one configuration using an intelligence model. The new configuration user interface 400 may comprise at least one of: at least one configuration option or a cancel option. In some embodiments, the at least one configuration option may comprise at least one of: a first configuration option 402 associated with an intelligence model, a second configuration option, or a third configuration option associated with a document. It is appreciated that the first user may select the at least one configuration option and/or the cancel option. According to one embodiment, selecting the first configuration option 402 associated with the intelligence model may display a configuration input user interface (e.g., the configuration input user interface 500 of FIG. 5). In some cases, selecting the cancel option may display a first configuration user interface (e.g., the first configuration user interface 700 of FIG. 7).

Figure 5:
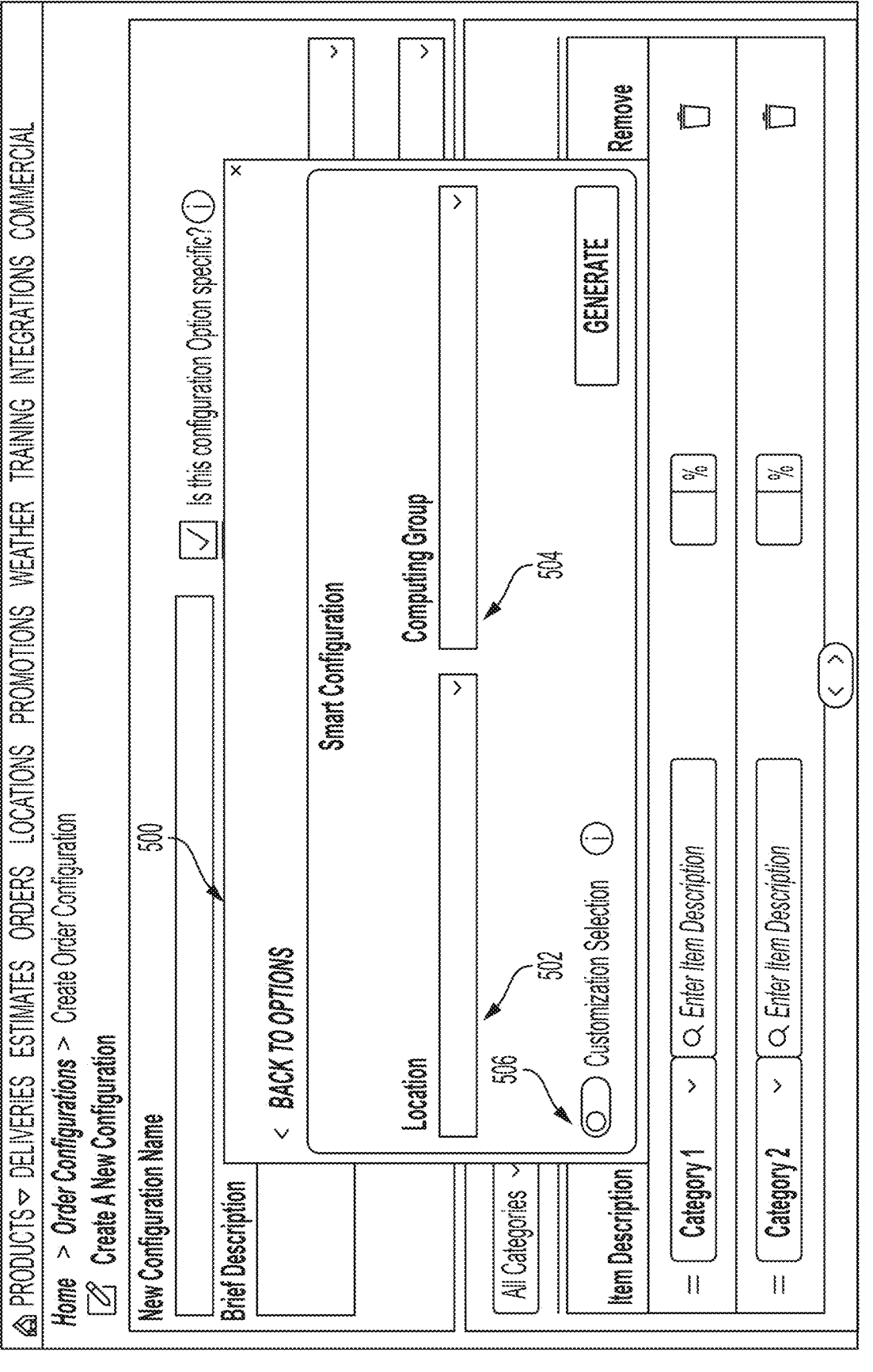

FIG. 5 shows an example configuration input user interface 500 for a first user within a system that generates at least one configuration using an intelligence model. The configuration input user interface 500 may comprise at least one of: a location input 502, a computing group input 504, at least one customization selection 506, a project type input, an indicator associated with the first user, a generate option, a back option, or a cancel option. In some embodiments, the first user may provide a location using the location input 502. According to other embodiments, the first user may provide a computing group using the computing group input 504. In yet other embodiments, the first user may provide a project type using the project type input. According to still other embodiments, the first user may provide the at least one customization selection 506 and/or the indicator associated with the first user. In some cases, the location may comprise at least one of: a local branch, store data, branch data, an address, a city, a state, an area code, etc.

According to one embodiment, the computing group may comprise at least one of: a manufacturer, a producer, a provider, a distributor, a company, a business, an individual, etc. In still another embodiment, the at least one customization selection 506 may comprise at least one optimization selection. Furthermore, in some embodiments, the at least one customization selection 506 may comprise at least one of: a warranty optimization selection, a certification level selection, a standard selection, etc. In some cases, the first user may opt to not provide the at least one customization selection 506. In other cases, the certification level selection and/or the standard selection may be associated with at least one of the warranty optimization selection, the computing group, security data, etc. In one embodiment, the standard selection may comprise a fortified standard, a certified standard, etc. According to yet another embodiment, the project type may comprise a material type, a job type, a building type, a property type, a system type, a contractor type, etc. In still another embodiment, the indicator associated with the first user may comprise a job associated with the first user, a title associated with the first user, a responsibility associated with the first user, a role associated with the first user, etc.

In some embodiments, the generate option may comprise a continue option, a next option, a submit option, a selection, etc. It is appreciated that the first user may select the generate option. According to one embodiment, selecting the generate option may display a configuration result user interface (e.g., the configuration result user interface 600 of FIG. 6). In another embodiment, selecting the generate option may generate at least one configuration. It is further appreciated that the first user may select the back option. According to another embodiment, selecting the back option may display a new configuration user interface (e.g., the new configuration user interface 400 of FIG. 4). It is also appreciated that the first user may select the cancel option. According to yet another embodiment, selecting the cancel option may display a first configuration user interface (e.g., the first configuration user interface 700 of FIG. 7). In some embodiments, a chat bot (e.g., an AI assistant) may facilitate receipt of inputs and/or generation of the at least one configuration. According to some embodiments, the at least one configuration may be generated upon receipt of a single input from the first user. In some cases, the single input may comprise a location (e.g., an address, a job site, a home address, a business address, etc.). In other embodiments, the at least one configuration may be generated without receiving any input from the first user.

FIG. 6 shows an example configuration result user interface 600 for a first user within a system that generates at least one configuration using an intelligence model. The configuration result user interface 600 may comprise at least one of: at least one configuration 602 or a cancel option. In some cases, the at least one configuration 602 is based on at least one of: the location, the computing group, the at least one customization selection, the project type, the indicator associated with the first user, a purchase or use history associated with the first user, user data, data associated with the location, computing group data, security data, item data, etc. In some embodiments, the at least one configuration 602 is generated using an intelligence model. Furthermore, the intelligence model, in one embodiment, receives at least one of the data associated with the location, the user data, computing group data, the purchase or use history associated with the first user, the security data (e.g., warranty data), the item data, etc. In another embodiment, the intelligence model is trained and/or prompt-tuned based on the at least one of the data associated with the location, the user data, the computing group data, the purchase or use history associated with the first user, the security data, the item data, etc. Furthermore, in some cases, the intelligence model is trained and/or prompt-tuned using data specific to an entity and/or company and/or method and/or process.

According to one embodiment, the data associated with the location may comprise inventory data associated with the location. According to another embodiment, the data associated with the location may comprise recent sales data associated with the location. In some embodiments, the user data may comprise data associated with the first user, data associated with a second user (e.g., a purchase or user history associated with the second user, an indicator associated with the second user, etc.), etc. According to other embodiments, the at least one configuration 602 may be comprised in or used in generating an estimate and/or a proposal (e.g., an estimate or project proposal comprising at least two ranked configurations, an estimate or project proposal comprising one configuration). In yet other embodiments, the at least one configuration 602 may be generated without receiving any input from the first user (e.g., the first user does not need to fill out the location input, the computing group input, etc.). According to still other embodiments, the at least one configuration 602 may be generated automatically (e.g., when the first user logs in, when the first user logs in for the first time, etc.).

In some cases, the at least one configuration 602 may be ranked (e.g., a first configuration may be indicated as a better match than a second configuration). It is appreciated that the at least one configuration 602 may be ranked using the intelligence model based on item data and/or user history data (e.g., user history data associated with the first user, user history data associated with a second user (e.g., wherein the second user has a similar purchase history and/or job type and/or project type), etc.) and/or sale data, and/or regional data, and/or weather data, and/or user context data, and/or public data and/or private data, etc. In other cases, the at least one configuration 602 may comprise a first configuration. In one embodiment, the first configuration may comprise at least one of: at least one first item, security data (e.g., warranty data), or a select option. In another embodiment, the first configuration may comprise a name and/or a description, and/or a label generated by the intelligence model (e.g., to describe a reasoning and/or a rationale associated with the first configuration, to give context associated with the first configuration (e.g., context associated with the at least one first item, context associated with the security data, etc.), etc.). According to yet another embodiment, the security data is associated with the at least one customization selection. In some cases, a first item comprised in the at least one first item may comprise or be associated with first item data (e.g., an item name, an item image, an item category, an item option, an item classification, an item quantity, an item status, an item availability, an item price, etc.). In other cases, the first item may comprise the first item data and/or a virtual item and/or a physical item and/or a product.

In still another embodiment, the at least one first item is selected (e.g., selected by the intelligence model) based on item data and/or user history data and/or sale data, and/or regional data, and/or weather data, and/or user context data, etc. For example, the at least one first item may comprise a first item and not comprise a second item, wherein the first item is higher rated than the second item, and/or the first item is more popular than the second item, and/or the first item is more locally or regionally popular than the second item, and/or the first item has been previously purchased by the first user or at least one first user and the second item has not, and/or the first item has been more previously purchased by the first user or at least one second user than the second item, and/or the first item has previously been substituted for the second item by the first user or at least one third user, etc.

According to some embodiments, the at least one first item may be more likely to comprise an item associated with a first item type (e.g., a brand, a label, a company, etc.). Any data (e.g., user data, weather data, regional data, security data, etc.) described herein may be sourced from at least one database, and/or intelligence model and/or search engine.

It is appreciated that, in some embodiments, the first user may select the first configuration. In some cases, selecting the first configuration may display a configuration user interface associated with the first configuration (e.g., the first configuration user interface 700 of FIG. 7). According to one embodiment, the first user may select at least one third item comprised in the at least one first item comprised in the first configuration and at least one fourth item comprised in at least one second item associated with a second configuration comprised in the at least one configuration (e.g., the first user can select items from any and/or all of the configurations comprised in the at least one configuration to build a custom configuration). It is further appreciated that the first user may select the cancel option. In other cases, selecting the cancel option may display a blank or at least partially blank configuration user interface (e.g., the first configuration user interface 700 of FIG. 7).

According to some embodiments, the first user may be prompted to input feedback (e.g., a rating, an indicator, a thumbs up or a thumbs down, a description, a suggestion for improvement, etc.) regarding the process for generating the at least one configuration. In other embodiments, feedback may be determined or generated based on whether the first user selects the first configuration, the second configuration, or the third configuration. According to yet other embodiments, feedback may be determined or generated based on how often the first user uses the selected configuration (e.g., in a given time frame), if the first user makes any changes to and/or updates the selected configuration, if the first user opts to make a new configuration, if the first user stops using the selected configuration, if the first user stops using the selected configuration in favor of a different method, etc.). It is appreciated that the intelligence model may adapt and/or adjust based on any of the feedback described herein.

In one embodiment, a region and/or a computing group and/or a user may generate and/or initiate generation of at least one preliminary configuration. According to another embodiment, the at least one preliminary configuration may be less detailed and/or less formatted and/or comprise less items and/or comprise less data, etc. than the at least one configuration 602. In yet another embodiment, the at least one preliminary configuration may be used to generate the at least one configuration 602 (e.g., to guide contents of the at least one configuration 602, to indicate a specific item type that is preferred, etc.). It is appreciated that the at least one configuration 602 may be generated for and/or added to and/or comprised in a sales packet and/or an estimate and/or a proposal associated with an address and/or a contractor and/or a company, etc.

FIG. 7 shows an example first configuration user interface 700 for a first user within a system that generates at least one configuration using an intelligence model. The first configuration user interface 700 may comprise at least one of: a configuration name, a configuration description, at least one configuration option, at least one first item 702, or at least one save option 704. In one embodiment, the configuration name may be generated using the intelligence model. In another embodiment, the configuration name may be received as an input from the first user. According to some embodiments, the configuration description may be generated using the intelligence model. According to other embodiments, the configuration description may be received as an input from the first user. In some cases, the at least one configuration option may comprise at least one of: a filter option, an account option, a specificity option, etc.

In some cases, a first item comprised in the at least one first item 702 may comprise or be associated with first item data comprising at least one of: an item name, an item image, an item category, an item option, an item classification, an item quantity, an item status, an item availability, an item price, etc. In other cases, the first item comprised in the at least one first item 702 may be edited or deleted. It is appreciated that the first user may select and/or edit at least one option associated with the first item (e.g., a quantity option, a unit of measurement option, a waste factor option, a rule option, a remove option, etc.). The at least one option, in some embodiments, may comprise an option to define at least one rule (e.g., a default rule, a measurement rule, a calculation rule, etc.) associated with the first item and/or at least one first item. In other embodiments, the at least one rule may be automatically applied to the configuration and/or a computing request using the configuration, and/or an estimate using the configuration. According to one embodiment, the first user may interact with a search bar to generate search results associated with the at least one first item 702 (e.g., search for an item name, search for an item id, search for an item type, etc.). The search results, in some embodiments, comprise at least one second item. In yet another embodiment, the search bar may further comprise a search filtering option. In other embodiments, the first user may interact with the search filtering option to filter the search results (e.g., filter by an item name, an item type, an item category, an item brand, etc.).

Figure 8:
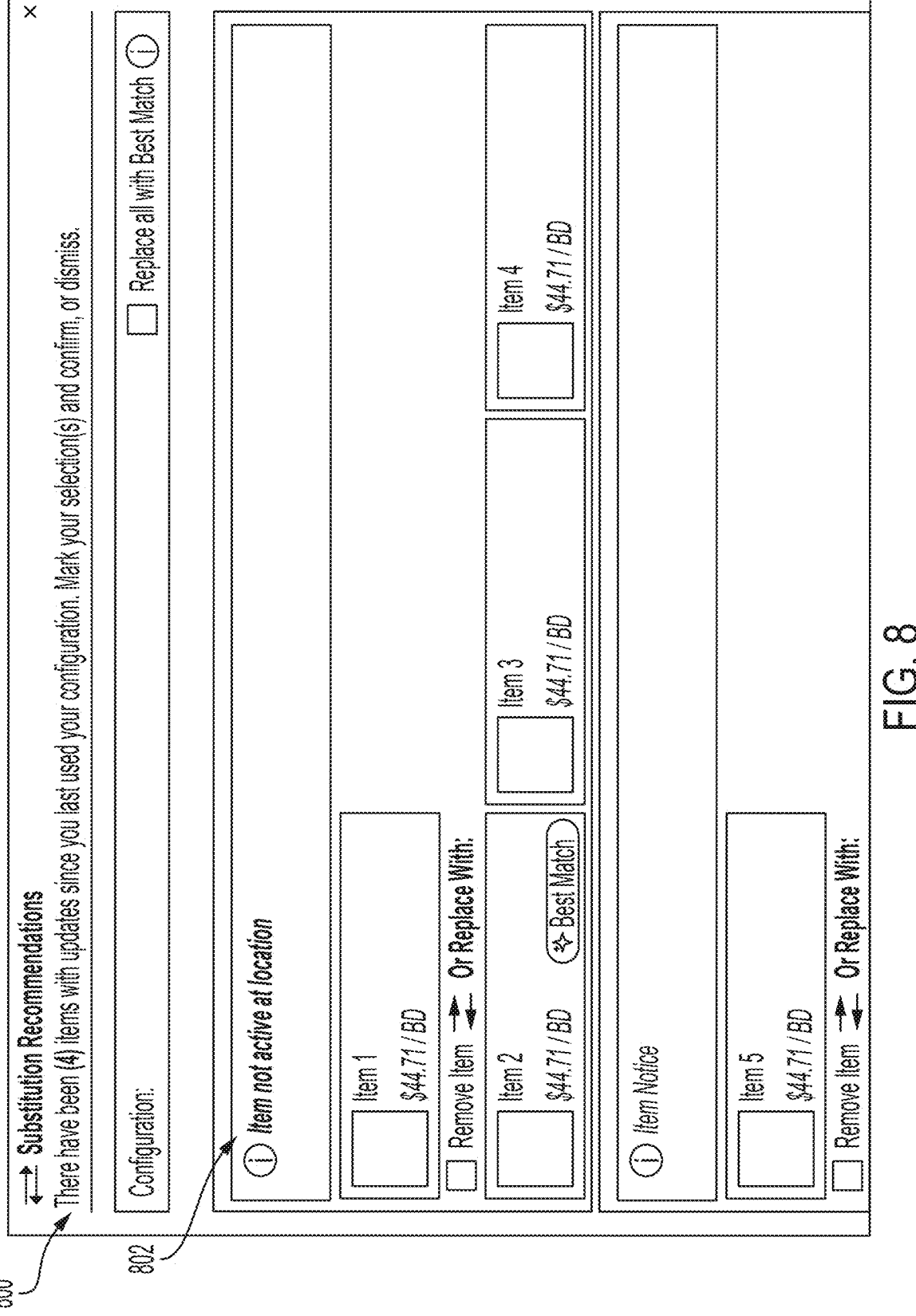
Figure 9:
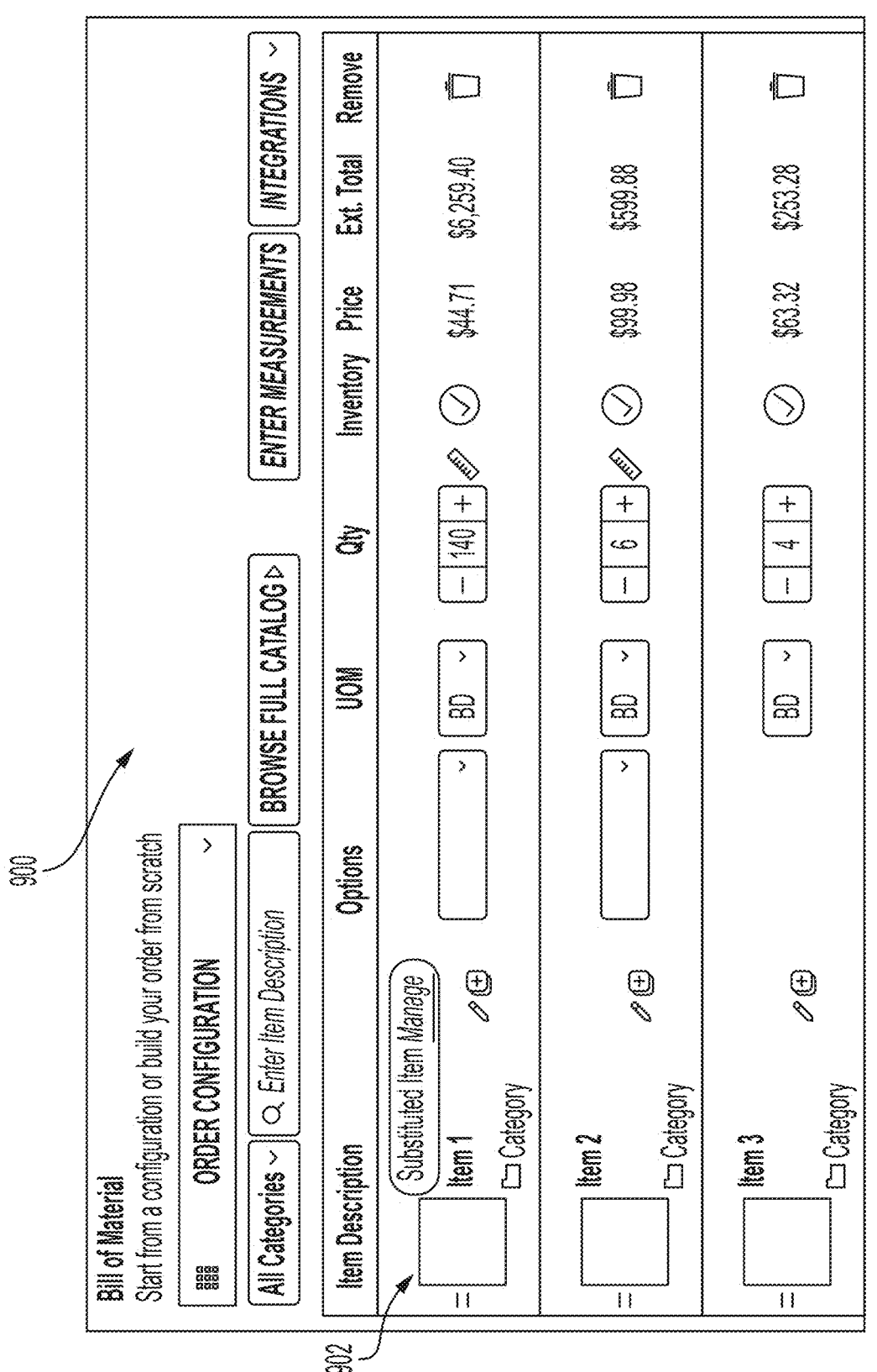

FIGS. 8 and 9 show example user interfaces to update a computing request using an intelligence model in a computing network.

FIG. 8 shows an example first recommendation user interface 800 for a first user within a system that updates a computing request using an intelligence model. The first recommendation user interface 800 may comprise at least one of: at least one recommendation 802, a recommendation option, at least one apply option, or a cancel option. In some embodiments, the at least one recommendation 802 is associated with or based on at least one of: a status associated with an item, a location associated with an item, a recent operation associated with a first item (e.g., an item that the first user or at least one first user has previously swapped), a price associated with an item, a requirement associated with an item, a quantity associated with an item, a user history associated with an item, a deal associated with an item, a warranty associated with an item, a brand associated with an item, a ratio of associated with at least one item, previous purchase data associated with an item, permit data, code date (e.g., local code data) associated with an item, weather data, a characteristic (e.g., a color, a quantity, etc.) associated with an item, etc. According to other embodiments, the at least one recommendation 802 may comprise a first recommendation.

In some cases, the at least one recommendation 802 may be ranked and/or sorted based on severity and/or priority (e.g., a more severe and/or more important recommendation may be displayed first and/or more prominently and/or higher than a less severe and/or a less important recommendation). In some embodiments, the at least one recommendation 802 may be used to update an out of date configuration. In some cases, the first recommendation comprised in the at least one recommendation 802 may be associated with a severity indicator. In other cases, the severity indicator and/or the first recommendation may be associated with a first color. In some embodiments, the first user may have to address the first recommendation based on the severity indicator (e.g., the first recommendation comprises an issue that will prevent the computing request from being placed). According to other embodiments, the first user may optionally address the first recommendation based on the severity indicator (e.g., the first recommendation comprises a warning that will not prevent the computing request from being placed). It is appreciated that the at least one recommendation 802 may be generated and/or displayed (e.g., as a notification) to the first user at any time while the first user is accessing the system (e.g., throughout an ordering process, an estimate creation process, a proposal creation process, etc.)

In yet other embodiments, the first recommendation may comprise at least one of: a first item, at least one recommended item, or a remove option. The first item, in one embodiment, may comprise an inactive item, an invalid item, a generic item, an out of stock item, a recently swapped item, a frequently swapped item, etc. According to another embodiment, the at least one recommended item may comprise at least one replacement item for the first item. In yet another embodiment, the at least one recommended item may comprise at least one of: at least one active item, at least one valid item, at least one similar item, at least one in stock item, at least one popular item, at least one recently bought item, at least one on-sale item, at least one promotional item, etc. In some cases, the at least one recommended item may be ranked (e.g., based on a probability the first user will select each item, based on user data, based on location data, etc.).

In one embodiment, the first recommendation may further comprise a replacement option. Furthermore, in some embodiments, selecting the replacement option may display a popup or a screen from which the first user may search for and/or select a replacement item to replace the first item. According to other embodiments, the remove option may be selected by the first user. It is appreciated that selecting the remove option may remove the first item from the computing request and/or the configuration. It is further appreciated that selecting a second item comprised in the at least one recommended item may replace the first item with the second item comprised in the at least one recommended item.

In other embodiments, the recommendation option may be selected by the first user. It is further appreciated that selecting the recommendation option may select a highest ranking item comprised in the at least one recommended item for each of the at least one recommendation. In some embodiments, the at least one apply option may comprise a first recommendation option and a second recommendation option. Selecting the first recommendation option, in one embodiment, will apply changes (e.g., replacements, removals, etc.) made by the first user to the computing request. In another embodiment, selecting the second recommendation option will apply the changes made by the first user to the computing request and the configuration. According to yet another embodiment, the first user may select the cancel option. It is appreciated that selecting the cancel option may display a computing request user interface (e.g., the computing request user interface 1000 of FIG. 10).

FIG. 9 shows an example second recommendation user interface 900 for a first user within a system that updates a computing request using an intelligence model. The second recommendation user interface 900 may comprise at least one item. In some cases, the at least one item may comprise a substituted first item 902. Furthermore, according to one embodiment, the substituted first item 902 is associated with the first recommendation option and/or the first item. In another embodiment, the substituted first item 902 comprises the second item comprised in the at least one recommended item. In some cases, the first user may edit and/or undo the substitution of the first item for the substituted first item 902.

For example, the first user may select an option (e.g., a manage option associated with the substituted first item 902). In other cases, selecting the option may enable the first user to review and/or modify the substitution of the first item for the substituted first item 902. According to one embodiment, the first user may interact with a search bar to generate search results associated with the at least one item 902. The search results, in some embodiments, comprise at least one second item. In yet another embodiment, the search bar may further comprise a search filtering option. According to still another embodiment, the first user may interact with the search filtering option to filter the search results (e.g., filter by an item name, an item type, an item category, an item brand, etc.). In some embodiments, the second recommendation user interface 900 may further comprise a measurement option. According to other embodiments, the first user may select the measurement option (e.g., the "Enter Measurements" option of FIG. 9). Furthermore, in yet other embodiments, selecting the measurement option may display a rule application user interface (e.g., the rule application user interface 1800 of FIG. 18).

Figure 10:
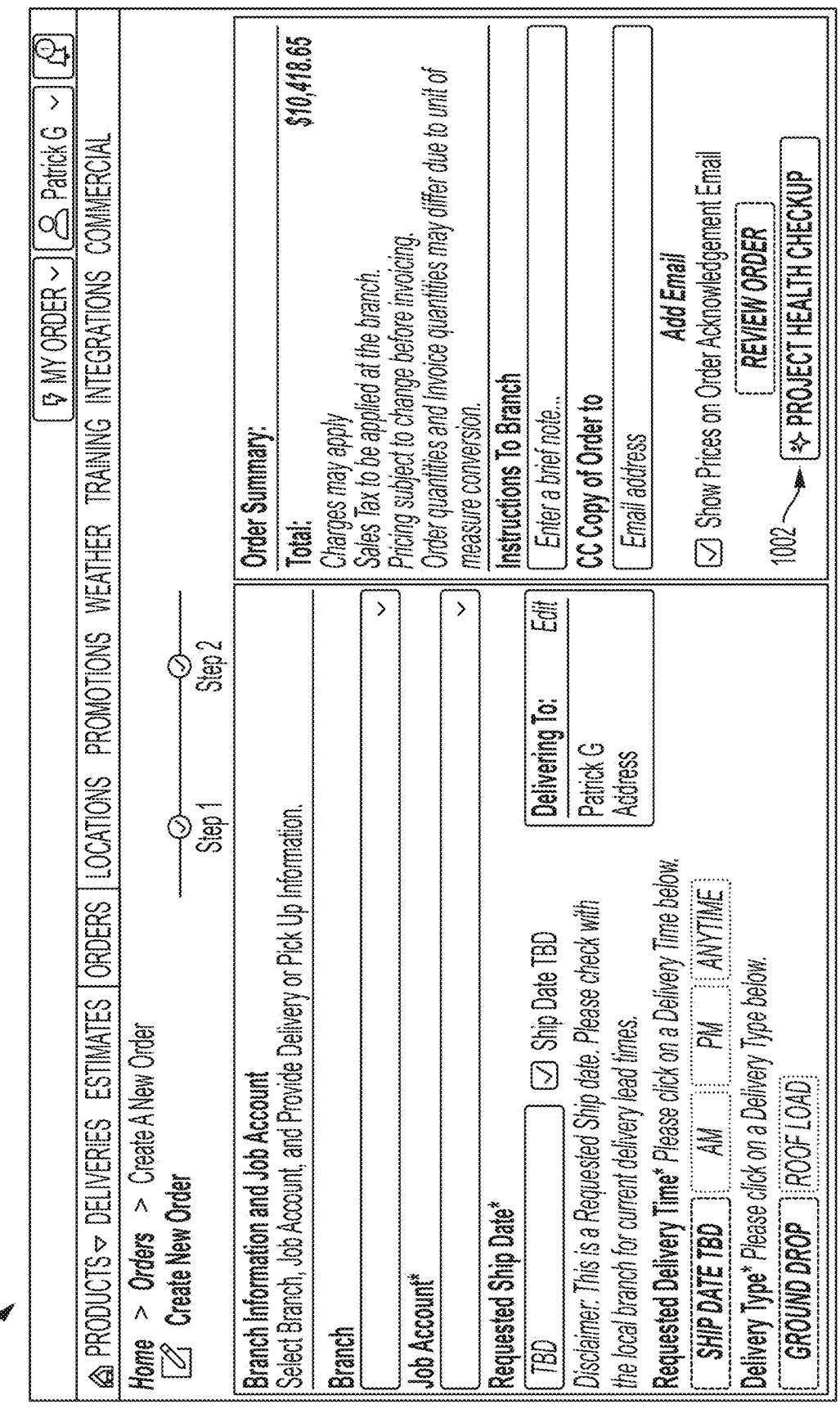

FIGS. 10 and 11 show example user interfaces to analyze a computing request using an intelligence model in a computing network.

FIG. 10 shows an example computing request user interface 1000 for a first user within a system that analyzes a computing request using an intelligence model. The computing request user interface 1000 may comprise at least one of: at least one item, computing request data, or an analysis option 1002. In some embodiments, the at least one item may be associated with a computing request (e.g., a completed computing request). According to other embodiments, the computing request data may comprise at least one of: location data, account data, delivery data, computing request summary data, etc. The location data, in one embodiment, may comprise a branch or store from which the computing request is placed. According to another embodiment, the account data may comprise an account and/or card and/or payment method associated with paying for the computing request.

In still another embodiment, the delivery data may comprise a delivery date, a delivery time, a delivery type, a delivery address, a delivery receiver (e.g., the first user, a first person, etc.), etc. In some cases, the first user may edit the computing request data. According to yet another embodiment, the computing request summary data may comprise a computing request total, computing request instructions or delivery instructions, correspondence data (e.g., associated with the first user, associated with a first person, etc.). In some cases, an information guide may be generated and/or provided to the first user based on the computing request (e.g., an installation guide associated with the at least one item). It is appreciated that the first user may select the analysis option. In some embodiments, selecting the analysis option may display a computing request analysis user interface (e.g., the computing request analysis user interface 1100 of FIG. 11). In other embodiments, selecting the analysis option may run or execute an analysis operation associated with the computing request.

According to some embodiments, the analysis operation associated with the computing request may be executed automatically (e.g., the first user does not need to select the analysis option).

FIG. 11 shows a computing request analysis example user interface 1100 for a first user within a system that analyzes a computing request using an intelligence model. The computing request analysis user interface 1100 may comprise at least one of: at least one analysis result 1102, an analysis option, or an apply option 1104. The at least one analysis result 1102 may, in some embodiments, comprise an issue, a critical issue, a warning, an alert, a recommendation, etc. In other embodiments, the at least one analysis result 1102 may be associated with an item issue (e.g., failure to meet requirements, missing requirements, a missing item, an item quantity, an item price, failure to meet a code requirement based on a location, etc.), weather data, timing data, security data (e.g., warranty data), promotion data, scheduling data, etc. According to one embodiment, a first result comprised in the at least one analysis result 1102 may comprise at least one of: a first item, at least one first item, a detail option, or a remove option. It is appreciated that the at least one analysis result 1102 may be generated and/or displayed to the first user at any time while the first user is accessing the system (e.g., throughout an ordering process, an estimate creation process, a proposal creation process, etc.).

In some cases, the first result comprised in the at least one analysis result 1102 may be associated with a severity indicator. In other cases, the severity indicator and/or the first result may be associated with a first color. In some embodiments, the first user may have to address the first result based on the severity indicator (e.g., the first result comprises an issue that will prevent the computing request from being placed). According to other embodiments, the first user may optionally address the first result based on the severity indicator (e.g., the first result comprises a warning that will not prevent the computing request from being placed). Furthermore, in some cases, the first item may be associated with an issue, and the at least one first item may be associated with resolving the issue. According to some embodiments, a second item comprised in the at least one first item may be selected by the first user to replace the first item. It is appreciated that the second item may comprise item data comprising or associated with an item category, an item name, an item image, etc.

In other embodiments, the first user may select the remove option to remove the first item from the computing request. According to yet other embodiments, the first user may select the detail option to view data associated with the first item. In some cases, a second result comprised in the at least one analysis result 1102 may comprise at least one of: an alert (e.g., a chance of rain, a chance of storms, a chance of snow, a holiday, etc.) associated with delivery of the computing request or a reschedule option. In one embodiment, the first user may select the reschedule option to edit the delivery of the computing request. In other cases, a third result comprised in the at least one analysis result 1102 may comprise an option to assign a task associated with the computing request (e.g., schedule a group to help complete and/or install the computing request).

According to one embodiment, the analysis option may be selected by the first user. It is further appreciated that selecting the analysis option may rerun or execute the analysis operation associated with the computing request. In another embodiment, the apply option 1104 may be selected by the first user. It is further appreciated that selecting the apply option 1104 may display a computing request user interface (e.g., the computing request user interface 1000 of FIG. 10). According to yet another embodiment, selecting the apply option 1104 may save any selections or changes made by the first user (e.g., the first user has selected to replace the first item with the second item, the first user has rescheduled delivery, etc.). In some cases, the at least one analysis result 1102 may be ranked and/or sorted based on severity and/or priority (e.g., a more severe and/or more important analysis result may be displayed first and/or more prominently and/or higher than a less severe and/or a less important analysis result). In other cases, the analysis operation may be run or executed at any time throughout a sale and/or computing request and/or a proposal (e.g., while generating an estimate, while generating a computing request, while generating a configuration, etc.).

Figure 12:
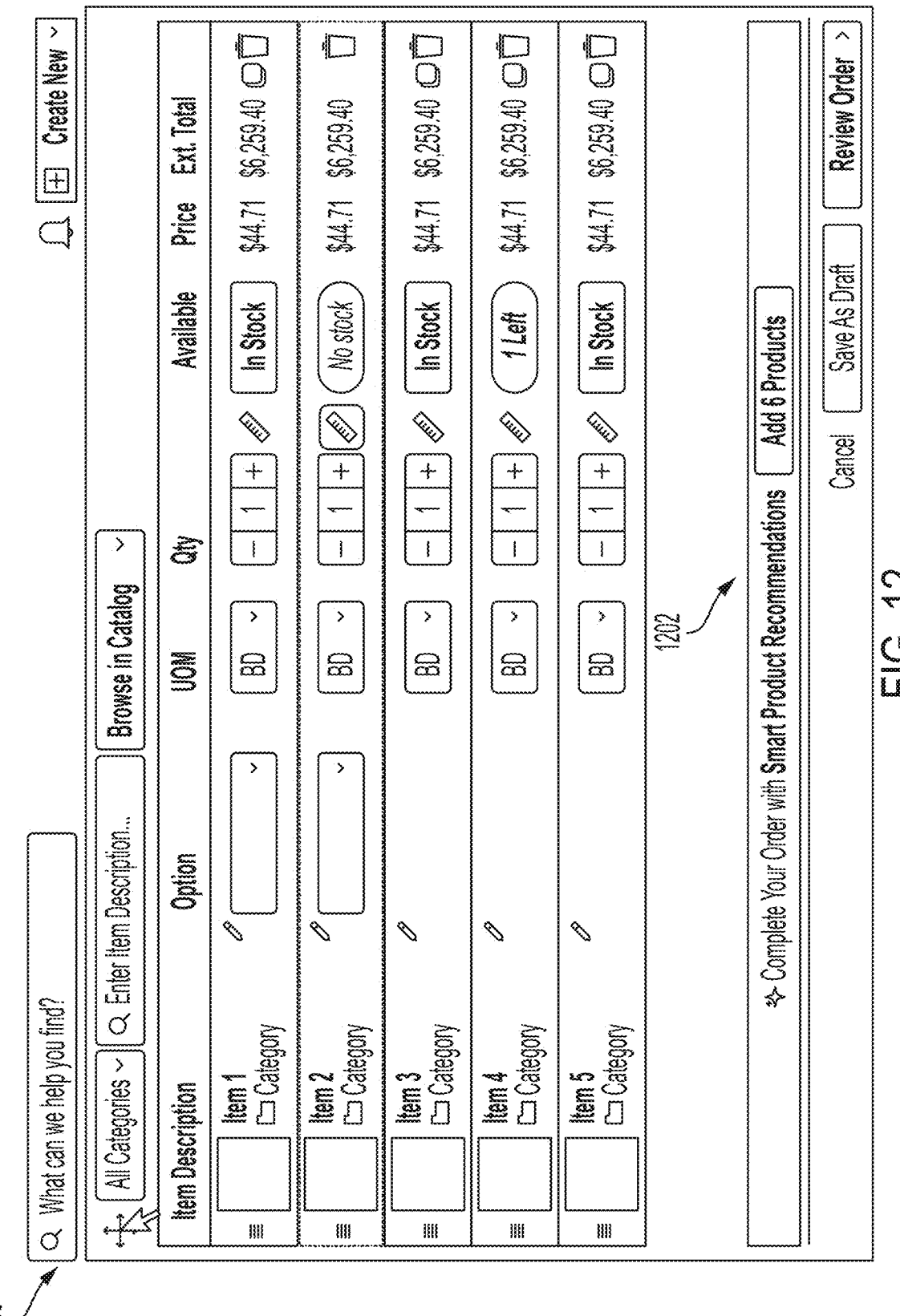
FIG. 12 shows an example user interface to generate at least one recommendation associated with a computing request using an intelligence model in a computing network.

FIG. 12 shows an example user interface to generate at least one recommendation associated with a computing request using an intelligence model in a computing network.

FIG. 12 shows an example partial computing request user interface 1200 for a first user within a system that generates at least one recommendation associated with a computing request using an intelligence model. The partial computing request user interface 1200 may comprise at least one of: at least one item, at least one recommendation 1202, a cancel option, a save option, or a next option. In some embodiments, a first item comprised in the at least one item may comprise or be associated with first item data (e.g., an item name, an item image, an item category, an item option, an item classification, an item quantity, an item status, an item availability, an item price, etc.). In other cases, the first item comprised in the at least one item may be edited or deleted. According to other embodiments, the at least one recommendation may be generated using an intelligence model. In still other embodiments, the at least one recommendation may be generated based on the at least one item (e.g., the at least one recommendation may recommend at least one second item that is often associated with the at least one item). According to yet other embodiments, the at least one recommendation may be generated based on at least one of: user history data, at least one recent computing request, user data, location data, the at least one item already comprised in the computing request, promotion data, etc.

In one embodiment, the first user may opt to apply the at least one recommendation to the computing request (e.g., complete the computing request, add at least one second item to the computing request, etc.). According to another embodiment, the first user may review the at least one recommendation. In some cases, the first user may choose to apply a subset of the at least one recommendation (e.g., add some, but not all, of the recommended items). In yet another embodiment, the cancel option may be selected by the first user. It is appreciated that selecting the cancel option may delete the computing request (e.g., the computing request may not be saved as a draft). According to still another embodiment, the save option may be selected by the first user. It is also appreciated that selecting the save option may save the computing request (e.g., the computing request may be saved as a draft). According to yet another embodiment, the next option may be selected by the first user. It is further appreciated that selecting the next option may display a computing request user interface (e.g., the computing request user interface 1000 of FIG. 10).

In other embodiments, selecting the next option may allow the first user to review the computing request or a summary associated with the computing request (e.g., before placing the computing request). According to one embodiment, the computing request may comprise an order. In another embodiment, the at least one recommendation may comprise a description, and/or a label generated by the intelligence model (e.g., to describe a reasoning and/or a rationale associated with the at least one recommendation, to give context associated with the at least one recommendation (e.g., context associated with the at least one second item), etc.). In some cases, the at least one recommendation may be based on security data (e.g., warranty eligibility) and/or a previous computing request and/or user history data and/or a job or project type, etc. According to one embodiment, the first user may interact with a search bar to generate search results associated with the at least one item. The search results, in some embodiments, comprise at least one second item. In yet another embodiment, the search bar may further comprise a search filtering option. In other embodiments, the first user may interact with the search filtering option to filter the search results (e.g., filter by an item name, an item type, an item category, an item brand, etc.).

Figure 13:
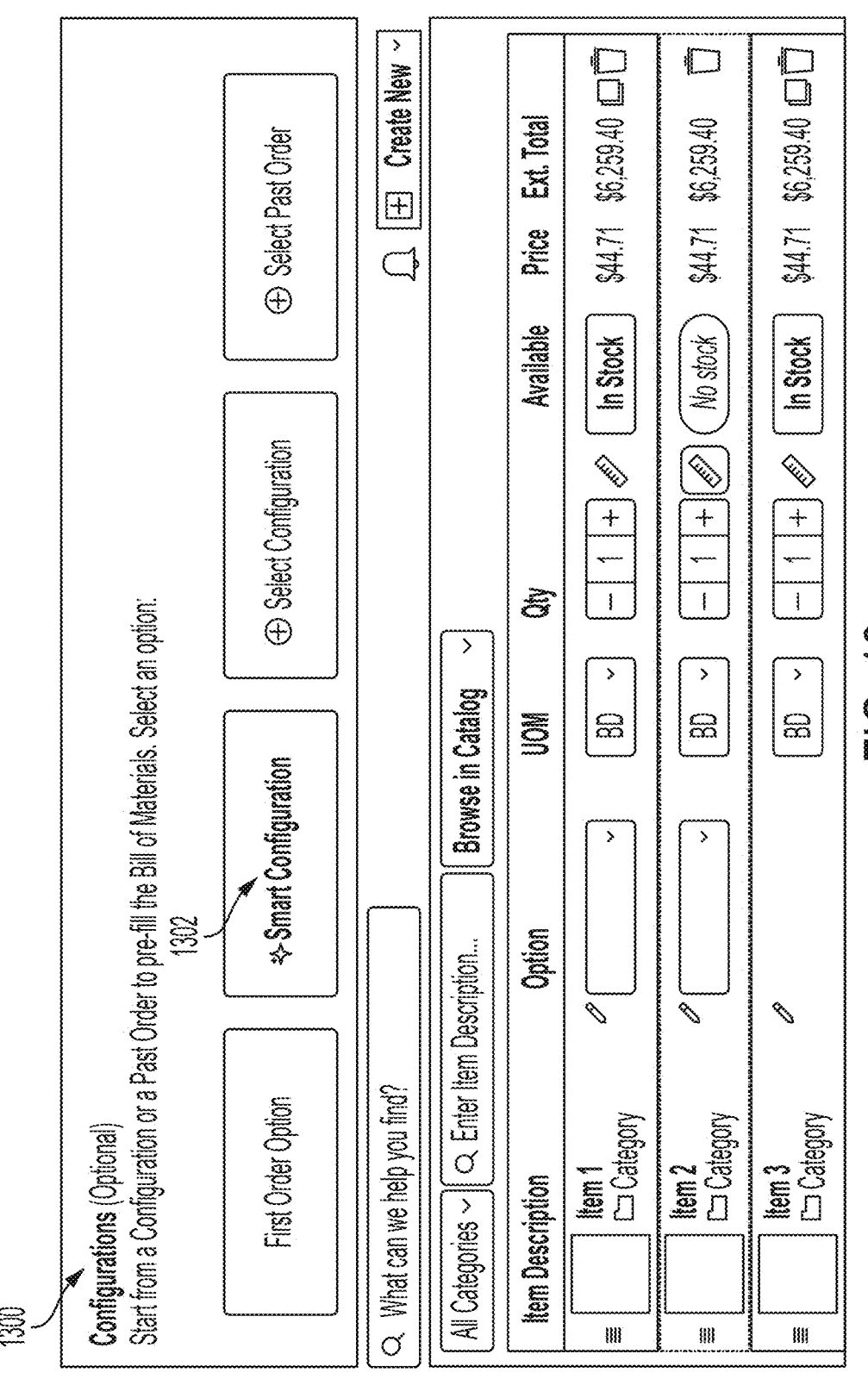
FIG. 13 shows an example user interface to generate a computing request using a configuration in a computing network.

FIG. 13 shows an example user interface to generate a computing request using a configuration in a computing network.

FIG. 13 shows a computing request user interface 1300 for a first user within a system that generates a computing request using a configuration. The computing request user interface 1300 may comprise at least one of: at least one computing request option, or computing request data. In some embodiments, the at least one computing request option comprises at least one of: a first order option, a first configuration option 1302, a second configuration option, or a second computing request option. In some embodiments, the first user may select the first configuration option 1302. It is appreciated that selection of the first configuration option 1302 may display a new configuration user interface (e.g., the new configuration user interface 400 of FIG. 4). According to other embodiments, selecting the first configuration option 1302 may initiate a method for generating at least one configuration using an intelligence model.

In still other embodiments, the system may facilitate generating at least one configuration using an intelligence model for an estimate and/or a project proposal. In one embodiment, the computing request data may comprise at least one of: at least one item. According to another embodiment, the computing request user interface 1300 may further comprise a search bar. In some cases, the first user may interact with the search bar to generate search results. The search results, in some embodiments, comprise at least one second item. In yet another embodiment, the computing request user interface 1300 may further comprise a filtering option. In other cases, the first user may interact with the filtering option to filter the search results (e.g., filter by an item name, an item type, an item category, an item brand, etc.).

Figure 16:
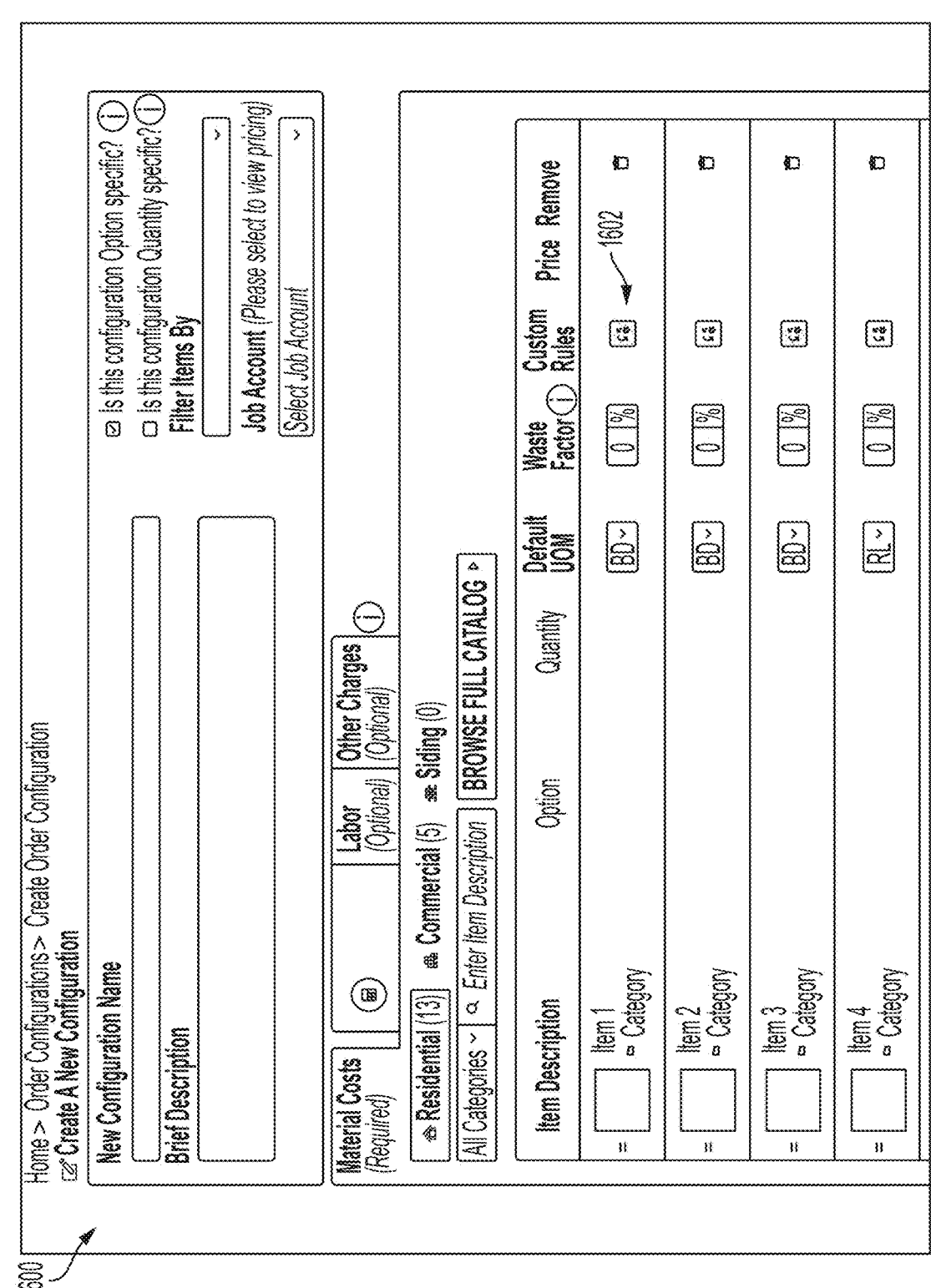
FIGS. 16, 17, and 18 show example user interfaces to generate a rule associated with a configuration in a computing network.
Figure 17:
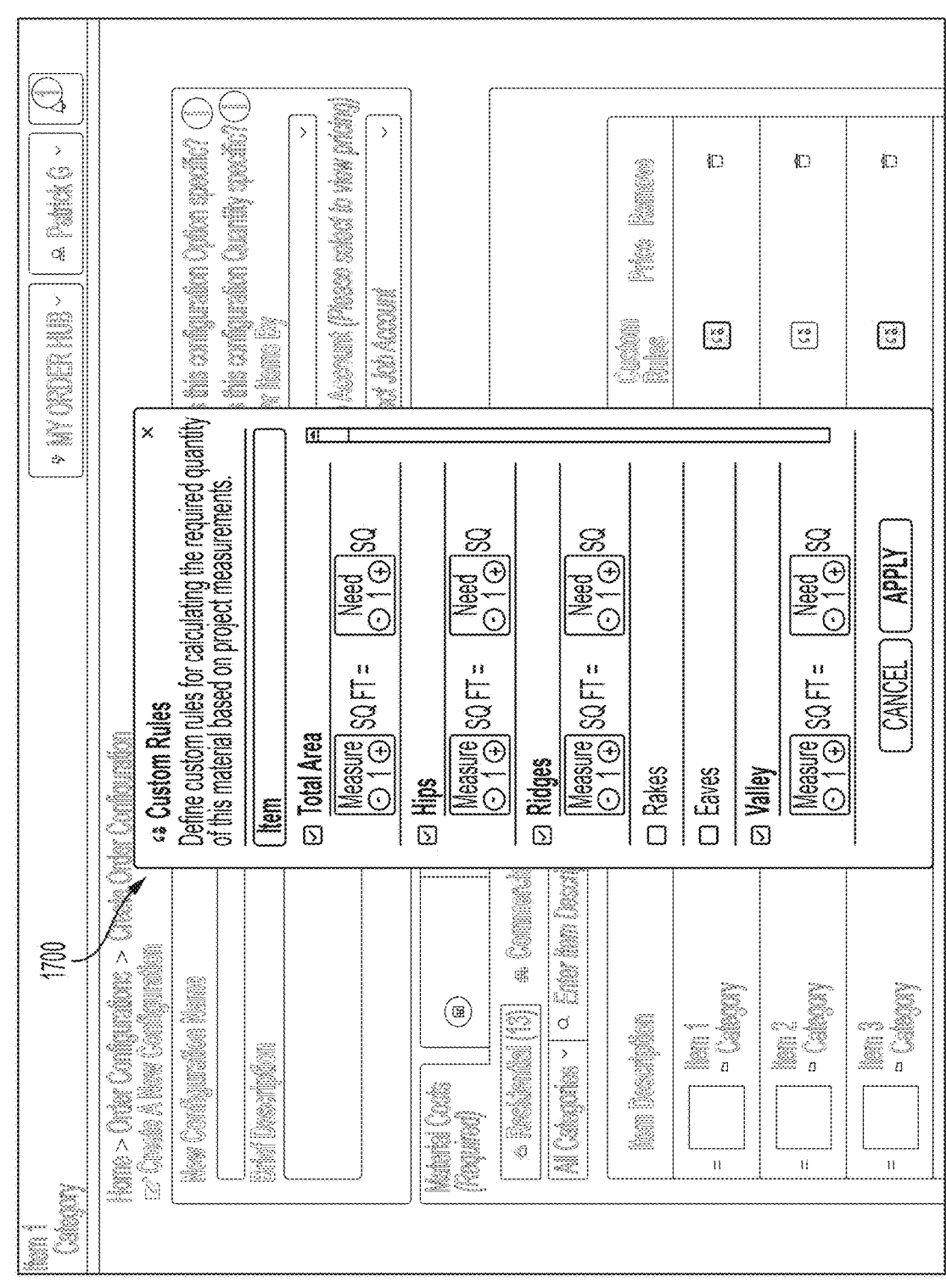
Figure 18:
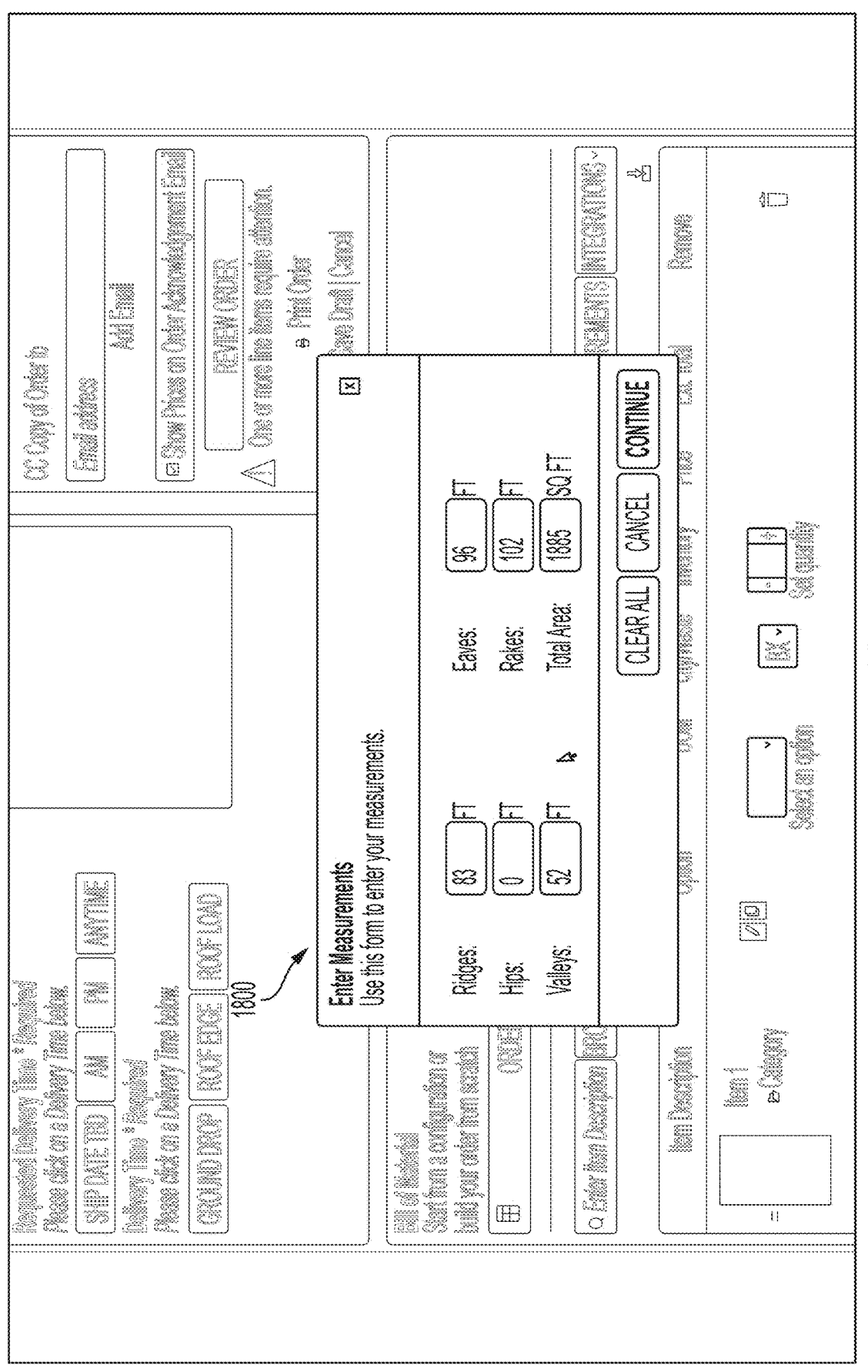

FIGS. 16, 17, and 18 show example user interfaces to generate a rule associated with a configuration in a computing network.

FIG. 16 shows a second configuration user interface 1600 for a first user within a system that generates a rule associated with a configuration in a computing network. The second configuration user interface 1600 may comprise at least one of: a configuration name, a configuration description, at least one configuration option, at least one first item, or at least one save option. In one embodiment, the configuration name may be generated using the intelligence model. In another embodiment, the configuration name may be received as an input from the first user. According to some embodiments, the configuration description may be generated using the intelligence model. According to other embodiments, the configuration description may be received as an input from the first user. In some cases, the at least one configuration option may comprise at least one of: a filter option, an account option, a specificity option, etc.

In some cases, a first item comprised in the at least one first item may comprise or be associated with first item data comprising at least one of: an item name, an item image, an item category, an item option, an item classification, an item quantity, an item status, an item availability, an item price, etc. In other cases, the first item comprised in the at least one first item may be edited or deleted. It is appreciated that the first user may select and/or edit at least one option associated with the first item (e.g., a quantity option, a measurement option, a waste factor option, a rule option, a remove option, etc.). The at least one option, in some embodiments, may comprise a rule option 1602. In some cases, the first user may select the rule option 1602. It is further appreciated that selecting the rule option 1602 may display a rule user interface (e.g., the rule user interface 1700 of FIG. 17). According to one embodiment, the first user may interact with a search bar to generate search results associated with the at least one first item. The search results, in some embodiments, comprise at least one second item. In yet another embodiment, the search bar may further comprise a search filtering option. In other embodiments, the first user may interact with the search filtering option to filter the search results (e.g., filter by an item name, an item type, an item category, an item brand, etc.).

FIG. 17 shows a rule user interface 1700 for a first user within a system that generates a rule associated with a configuration in a computing network. The rule user interface 1700 may comprise at least one of: at least one category, a cancel option, or an apply option. In some embodiments, a first category comprised in the at least one category may comprise or be associated with at least one of: a measurement, a feature, a size, or a part associated with a project. According to other embodiments, the first category comprised in the at least one category may comprise at least one of: a measurement input or a requirement input. In yet other embodiments, the first user may input and/or edit a measurement using the measurement input. According to still other embodiments, the first user may input and/or edit a requirement using the requirement input. It is appreciated that, in some cases, the requirement input is associated with a unit of measurement. According to one embodiment, a change in the unit of measurement may change the requirement input. According to another embodiment, the change in the unit of measurement may prompt the first user to verify and/or update the measurement and/or the requirement.

It is appreciated that the measurement and the requirement may be used to define at least one rule (e.g., a default rule, a measurement rule, a calculation rule, etc.) associated with the first item. In some cases, the measurement and the requirement generate a conversion factor to be used in calculations associated with the first item. According to some embodiments, a waste factor (e.g., a waste factor received as an input by the first user, a default waste factor, etc.) may be used in the calculations. In other cases, the first user must select the first category in order to define and/or set the at least one rule. In one embodiment, the at least one rule may be automatically applied to a computing request using the configuration, and/or an estimate using the configuration, and/or a proposal using the configuration, etc. It is appreciated that the first user may select the cancel option and/or the apply option. According to one embodiment, selecting the cancel option may display a configuration user interface (e.g., the second configuration user interface 1600 of FIG. 16). In another embodiment, selecting the apply option may display a configuration user interface (e.g., the second configuration user interface 1600 of FIG. 16). According to yet another embodiment, selecting the apply option may save and/or apply any changes made by the first user (e.g., save the at least one rule associated with the first item and/or the at least one first item.

FIG. 18 shows a rule application user interface 1800 for a first user within a system that generates a rule associated with a configuration in a computing network. The rule application user interface 1800 may comprise at least one of: data associated with a computing request, at least one measurement input, a clear option, a cancel option, or a continue option. According to one embodiment, the computing request may comprise at least one first item. It is appreciated that the computing request may be built and/or populated using a configuration. Furthermore, in another embodiment, the at least one first item comprises a first item for which at least one rule has been set previously in the configuration. In some embodiments, the first user may input the at least one measurement input. According to other embodiments, the at least one measurement input may be automatically input based on importing a report (e.g., importing a report from a third party measurement tool). In one embodiment, upon receiving the measurements, item data (e.g., an item quantity) may be automatically updated and/or added by applying the at least one rule. In some cases, the measurements may be associated with a project and/or a job.

It is appreciated that the first user may select the clear option and/or the cancel option and/or the continue option. According to one embodiment, selecting the clear option may clear and/or erase and/or reset the measurements. In another embodiment, selecting the cancel option may display a computing request user interface (e.g., the computing request user interface of FIG. 10). In another embodiment, selecting the continue option (e.g., an apply option, a next option, a submit option, etc.) may display a computing request user interface (e.g., the computing request user interface 1000 of FIG. 10). According to yet another embodiment, selecting the continue option may save and/or apply any changes made by the first user (e.g., save the measurements).

Figure 19:
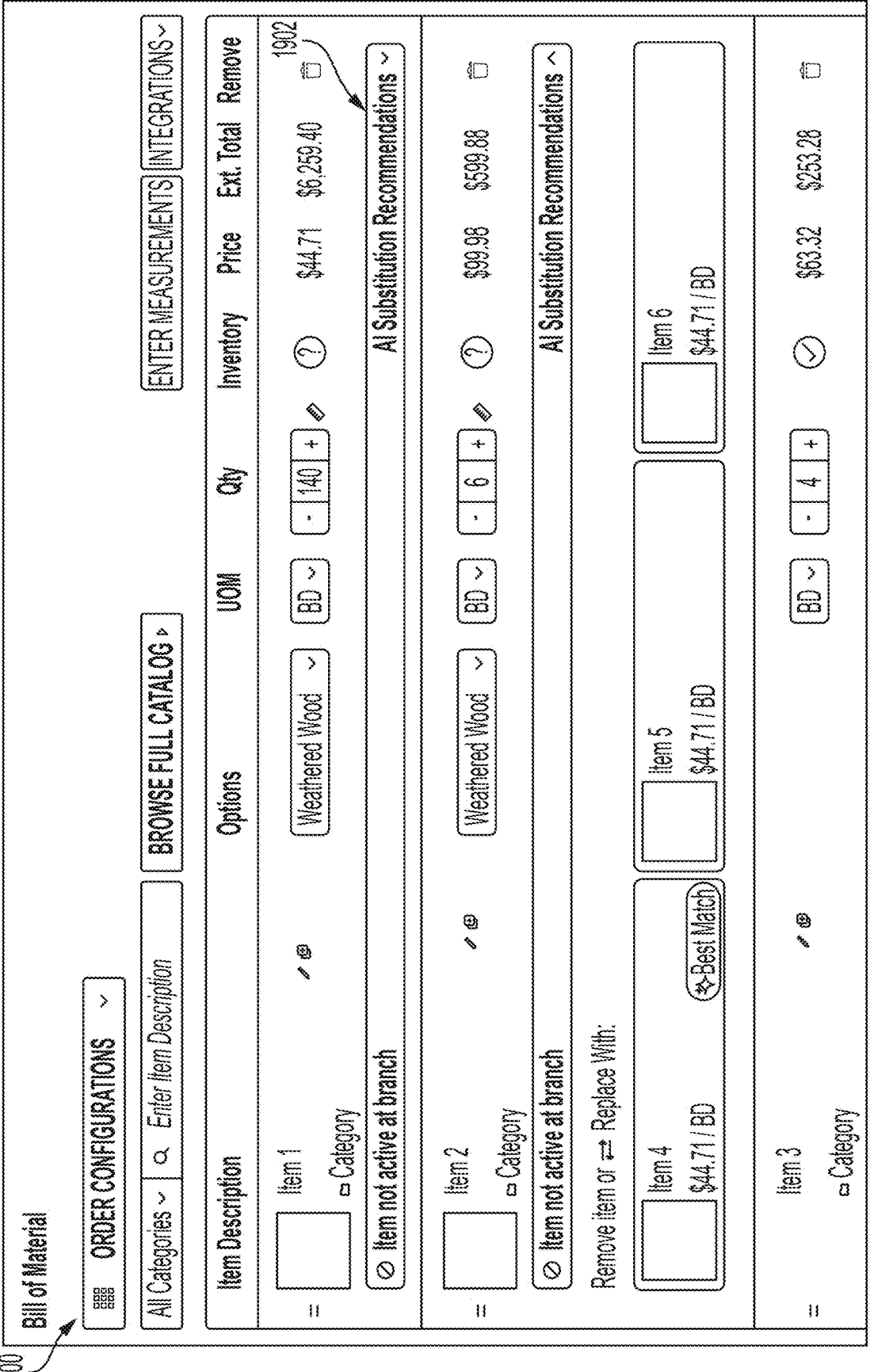
FIG. 19 shows an example user interface to update a computing request using an intelligence model in a computing network.

FIG. 19 shows an example user interface to update a computing request using an intelligence model in a computing network.

FIG. 19 shows a computing request recommendation user interface 1900 for a first user within a system that updates a computing request using an intelligence model in a computing network. The computing request recommendation user interface 1900 may comprise at least one of: computing request data or at least one item. In some embodiments, a first item comprised in the at least one item may comprise a first recommendation 1902 and/or a remove option. According to other embodiments, the first user may select and/or open the first recommendation 1902. In yet other embodiments, the first recommendation 1902 may be associated with or based on at least one of: a status (e.g., an inactive status) associated with the first item, a location (e.g., the first item is out of stock at the location), a recent operation associated with the first item (e.g., the first user or at least one first user has previously swapped the first item for a second item), a price associated with the first item, a promotion associated with the first item, a requirement associated with the first item, a quantity associated with the first item, a user history associated with the first item, a deal or sale associated with the first item, a warranty associated with the first item, a brand of the first item, etc.

In some embodiments, the first recommendation 1902 may be used to update an out of date configuration. In some cases, the first recommendation 1902 may be associated with a severity indicator. According to other embodiments, the first user may have to address the first recommendation based on the severity indicator (e.g., the first recommendation comprises an issue that will prevent the computing request from being placed). According to other embodiments, the first user may optionally address the first recommendation based on the severity indicator (e.g., the first recommendation comprises a warning that will not prevent the computing request from being placed). In yet other embodiments, the first recommendation may comprise at least one of: the first item, at least one recommended item, or a remove option. The first item, in one embodiment, may comprise an inactive item, an invalid item, a generic item, an out of stock item, a recently swapped item, a frequently swapped item, etc.

According to another embodiment, the at least one recommended item may comprise at least one replacement item for the first item. In yet another embodiment, the at least one recommended item may comprise at least one of: at least one active item, at least one valid item, at least one similar item, at least one in stock item, at least one popular item, at least one recently bought item, at least one on-sale item, at least one promotional item, etc. In some cases, the at least one recommended item may be ranked (e.g., based on a probability the first user will select each item, based on user data, based on user history data, based on location data, etc.). It is appreciated that selecting a second item comprised in the at least one recommended item may replace the first item with the second item comprised in the at least one recommended item. According to other embodiments, the remove option associated with the first item may be selected by the first user. It is further appreciated that selecting the remove option may remove the first item from the computing request and/or the configuration.

In one embodiment, the first recommendation may further comprise a replacement option. Furthermore, in some embodiments, selecting the replacement option may display a popup or a screen from which the first user may search for and/or select a replacement item to replace the first item. In other embodiments, the computing request recommendation user interface 1900 may further comprise a recommendation option. Furthermore, according to yet other embodiments, the recommendation option may be selected by the first user. It is appreciated that selecting the recommendation option may select a highest ranking item comprised in the at least one recommended item for each item that comprises a recommendation.

Exemplary Flowcharts

Figure 14B:
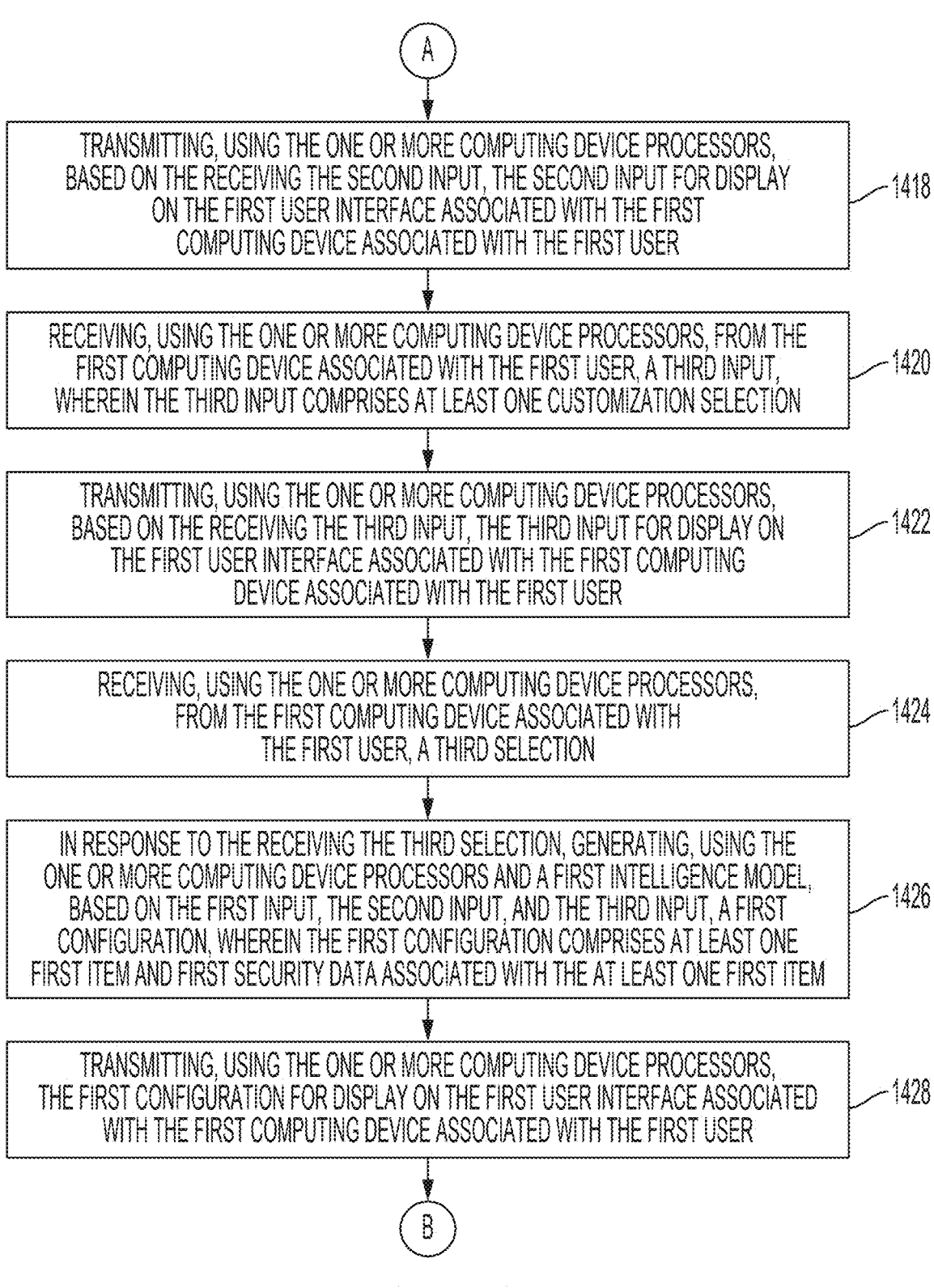

FIGS. 14A, 14B, and 14C are block diagrams of a method for generating a configuration using an intelligence model in a complex computing network. The various blocks of FIGS. 14A, 14B, and 14C may be executed in a different order from that shown in FIGS. 14A, 14B, and 14C. Some blocks may be optional. It is appreciated that one or more data engines stored in one or more memory devices may cause one or more computing device processors to execute the various processing stages of the workflow of FIGS. 14A, 14B, and 14C.

At block 1402 of FIG. 14A, the method comprises determining, using one or more computing device processors, a first user accesses a first system. In some embodiments, the one or more computing device processors are comprised in one or more computing systems, wherein the one or more computing systems are located in one or more locations. At block 1404, the method comprises receiving, using the one or more computing device processors, from a first computing device associated with the first user, a first selection, wherein the first selection comprises a first configuration option. In some embodiments, the first configuration option comprises a new configuration option or a new computing request option.

At block 1406, the method comprises transmitting, using the one or more computing device processors, based on the first selection, a first computing object for display on a first user interface associated with the first computing device associated with the first user.

At block 1408, the method comprises receiving, using the one or more computing device processors, from the first computing device associated with the first user, a second selection, wherein the second selection comprises a second configuration option. According to other embodiments, the second configuration option comprises a configuration option associated with an intelligence model.

At block 1410, the method comprises transmitting, using the one or more computing device processors, based on the second selection, a first configuration object for display on the first user interface associated with the first computing device associated with the first user. At block 1412, the method comprises receiving, using the one or more computing device processors, from the first computing device associated with the first user, a first input, wherein the first input comprises location data. According to one embodiment, the location data comprises at least one of: store data, branch data, a site name, an address, a city, a state, or an area code. In some embodiments, the location data may be determined automatically (e.g., using a geolocation service, based on an IP address, based on a Wi-Fi network, etc.). According to other embodiments, the location data may be determined based on an indication associated with an account associated with the first user. Furthermore, in yet other embodiments, the location data may be determined without requiring and/or receiving a user input.

At block 1414, the method comprises transmitting, using the one or more computing device processors, based on the receiving the first input, the first input for display on the first user interface associated with the first computing device associated with the first user. At block 1416, the method comprises receiving, using the one or more computing device processors, from the first computing device associated with the first user, a second input, wherein the second input comprises a computing group. According to another embodiment, the computing group comprises at least one of: a manufacturer, a producer, a provider, a distributor, a company, or a business. In some embodiments, the computing group may be determined automatically. According to other embodiments, the computing group may be determined based on an indication associated with an account associated with the first user. Furthermore, in yet other embodiments, the computing group may be determined without requiring and/or receiving a user input.

Turning to FIG. 14B, at block 1418, the method comprises transmitting, using the one or more computing device processors, based on the receiving the second input, the second input for display on the first user interface associated with the first computing device associated with the first user. At block 1420, the method comprises receiving, using the one or more computing device processors, from the first computing device associated with the first user, a third input, wherein the third input comprises at least one customization selection. In some cases, the at least one customization selection comprises at least one of: an optimization selection, a personalization selection, a warranty selection, a certification level selection, or a standard selection. In some embodiments, the at least one customization selection may be determined automatically. According to other embodiments, the at least one customization selection may be determined based on an indication associated with an account associated with the first user. Furthermore, in yet other embodiments, the at least one customization selection may be determined without requiring and/or receiving a user input.

At block 1422, the method comprises transmitting, using the one or more computing device processors, based on the receiving the third input, the third input for display on the first user interface associated with the first computing device associated with the first user. At block 1424, the method comprises receiving, using the one or more computing device processors, from the first computing device associated with the first user, a third selection. In some cases, the third selection comprises a generate option, a continue option, a next option, etc.

At block 1426, the method comprises in response to the receiving the third selection, generating, using the one or more computing device processors and a first intelligence model, based on the first input, the second input, and the third input, a first configuration, wherein the first configuration comprises at least one first item and first security data associated with the at least one first item. According to one embodiment, the intelligence model is hosted on a third-party server. In another embodiment, the intelligence model is hosted on a local server. According to some embodiments, at least one of: the first configuration is associated with supplying the at least one first item to the first user, or the first configuration comprises a template. In other embodiments, at least one of: the first security data is associated with the at least one customization selection, or the first security data comprises or is associated with warranty data associated with the at least one first item.

At block 1428, the method comprises transmitting, using the one or more computing device processors, the first configuration for display on the first user interface associated with the first computing device associated with the first user. Turning to FIG. 14C, at block 1430, the method comprises in response to the receiving the third selection, generating, using the one or more computing device processors and the first intelligence model, based on the first input, the second input, and the third input, a second configuration, wherein the second configuration comprises at least one second item and second security data associated with the at least one second item.

At block 1432, the method comprises transmitting, using the one or more computing device processors, the second configuration for display on the first user interface associated with the first computing device associated with the first user. At block 1434, the method comprises in response to the receiving the third selection, generating, using the one or more computing device processors and the first intelligence model, based on the first input, the second input, and the third input, a third configuration, wherein the third configuration comprises at least one third item and third security data associated with the at least one third item.

At block 1436, the method comprises transmitting, using the one or more computing device processors, the third configuration for display on the first user interface associated with the first computing device associated with the first user. At block 1438, the method comprises ranking, using the one or more computing device processors and the first intelligence model, the first configuration, the second configuration, and the third configuration. It is appreciated that the ranking the first configuration, the second configuration, and the third configuration is based on at least one of: the first security data, the second security data, the third security data, account history data associated with the first user, or account history data associated with a second user.

In some embodiments, the method further comprises receiving, using the one or more computing device processors, from the first computing device associated with the first user, a fourth input, wherein the fourth input comprises a classifier associated with the first user. Furthermore, according to one embodiment, at least one of: the generating, based on the first input, the second input, and the third input, the first configuration is further based on the fourth input, the generating, based on the first input, the second input, and the third input, the second configuration is further based on the fourth input, the generating, based on the first input, the second input, and the third input, the third configuration is further based on the fourth input, or the classifier associated with the first user comprises or is associated with a position type or designation associated with the first user.

According to other embodiments, the method further comprises receiving, using the one or more computing device processors, from the first computing device associated with the first user, a fourth selection, wherein the fourth selection comprises the first configuration. Furthermore, in another embodiment, the method further comprises receiving, using the one or more computing device processors, from the first computing device associated with the first user, a fifth selection or a fourth input associated with a first item comprised in the at least one first item; and updating, based on the fifth selection or the fourth input associated with the first item comprised in the at least one first item, the first configuration.

In yet other embodiments, the method further comprises receiving, using the one or more computing device processors, from the first computing device associated with the first user, a fourth input, wherein the fourth input comprises an indicator associated with the first user. Furthermore, in still another embodiment, at least one of: the generating, based on the first input, the second input, and the third input, the first configuration is further based on the fourth input, the generating, based on the first input, the second input, and the third input, the second configuration is further based on the fourth input, the generating, based on the first input, the second input, and the third input, the third configuration is further based on the fourth input, the indicator associated with the first user comprises or is associated with a certification level or credentials associated with the first user, or the indicator associated with the first user is associated with the at least one optimization selection or the computing group.

FIGS. 15A and 15B are block diagrams of a method for generating at least one recommendation associated with a computing request using an intelligence model in a complex computing network. The various blocks of FIGS. 15A and 15B may be executed in a different order from that shown in FIGS. 15A and 15B. Some blocks may be optional. It is appreciated that one or more data engines stored in one or more memory devices may cause one or more computing device processors to execute the various processing stages of the workflow of FIGS. 15A and 15B.

At block 1502 of FIG. 15A, the method comprises determining, using one or more computing device processors, a first user accesses a first system. In some embodiments, the one or more computing device processors are comprised in one or more computing systems, wherein the one or more computing systems are located in one or more locations. At block 1504, the method comprises receiving, using the one or more computing device processors, from the first computing device associated with the first user, a first selection, wherein the first selection comprises or is associated with a first computing request.

At block 1506, the method comprises transmitting, using the one or more computing device processors, based on the first selection, the first computing request for display on the first user interface associated with the first computing device associated with the first user. At block 1508, the method comprises receiving, using the one or more computing device processors, from the first computing device associated with the first user, a second selection, wherein the second selection comprises or is associated with a first configuration.

At block 1510, the method comprises transmitting, using the one or more computing device processors, based on the second selection, the first configuration for display on the first user interface associated with the first computing device associated with the first user, wherein the first configuration comprises at least one first item. At block 1512, the method comprises generating, using the one or more computing device processors and an intelligence model, a first recommendation associated with a first item comprised in the at least one first item, wherein the first recommendation is associated with or based on at least one of: location data associated with the first item, a status associated with the first item, or a classification associated with the first item.

At block 1514, the method comprises transmitting, using the one or more computing device processors, the first recommendation associated with the first item comprised in the at least one first item for display on the first user interface associated with the first computing device associated with the first user. Turning to FIG. 15B, at block 1516, the method comprises receiving, using the one or more computing device processors, from the first computing device associated with the first user, a second selection, wherein the second selection is associated with the first recommendation associated with the first item comprised in the at least one first item.

At block 1518, the method comprises transmitting, using the one or more computing device processors, the second selection for display on the first user interface associated with the first computing device associated with the first user. At block 1520, the method comprises receiving, using the one or more computing device processors, from the first computing device associated with the first user, a third selection. In some cases, the third selection comprises a continue option, a save option, a next option, etc.

At block 1522, the method comprises in response to receiving the third selection, updating, using the one or more computing device processors, the first computing request, thereby generating an updated first computing request, wherein the updated first computing request comprises at least one second item, wherein the at least one second item does not comprise the first item. At block 1524, the method comprises transmitting, using the one or more computing device processors, the updated first computing request for display on the first user interface associated with the first computing device associated with the first user.

This patent application incorporates by reference the following commonly owned application, naming the same inventors, and filed on the same date as the present application: U.S. patent application Ser. No. 19/284,262, titled "Updating A Computing Request Using An Intelligence Model In A Computing Network," filed on Jul. 29, 2025.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to explain the principles of the disclosed subject matter and its practical applications, to thereby enable others skilled in the art to use the technology disclosed and various embodiments with various modifications as are suited to the particular use contemplated.

It is appreciated that the term optimize/optimal and its variants (e.g., efficient or optimally) may simply indicate improving, rather than the ultimate form of 'perfection' or the like.

Furthermore, the functions or operations described above can be implemented in digital electronic circuitry, in computer software, firmware or hardware. In particular, the disclosed techniques can be implemented using one or more computer program products. The computer program products, in some embodiments, comprises non-transitory computer-readable media comprising code configured to execute the disclosed approach, embodiments, methods, process flows, etc. Programmable processors and computers can be included in or packaged as mobile devices according to some embodiments. The processes and logic flows can be performed by one or more programmable processors and by one or more programmable logic circuitry. General and special purpose computing devices and storage devices can be interconnected through communication networks.

It will also be understood that, although the terms first, second, etc., may be used herein to describe various elements, these elements should not be limited by these terms. These terms are used to distinguish one element from another. For example, a first object or step could be termed a second object or step, and, similarly, a second object or step could be termed a first object or step, without departing from the scope of the disclosure. The first object or step, and the second object or step, are both objects or steps, respectively, but they are not to be considered the same object or step.

The terminology used in the description herein is for the purpose of describing particular embodiments and is not intended to be limiting. As used in the description of the disclosure and the appended claims, the singular forms "a," "an" and "the" are intended to include the plural forms as well, unless the context clearly indicates otherwise. It will also be understood that the term "and/or" as used herein refers to and encompasses any possible combination of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context.

Those with skill in the art will appreciate that while some terms in this disclosure may refer to absolutes, e.g., all source receiver traces, each of a plurality of objects, etc., the methods and techniques disclosed herein may also be performed on fewer than all of a given thing, e.g., performed on one or more components and/or performed on one or more source receiver traces. Accordingly, in instances in the disclosure where an absolute is used, the disclosure may also be interpreted to be referring to a subset.

What is claimed is:

1. A method for generating at least one configuration using an intelligence model in a computing network, the method comprising:

determining, using one or more computing device processors, a first user accesses a first system;

receiving, using the one or more computing device processors, from a first computing device associated with the first user, a first selection, wherein the first selection comprises a first configuration option;

transmitting, using the one or more computing device processors, based on the first selection, a first computing object for display on a first user interface associated with the first computing device associated with the first user;

receiving, using the one or more computing device processors, from the first computing device associated with the first user, a second selection, wherein the second selection comprises a second configuration option;

transmitting, using the one or more computing device processors, based on the second selection, a first configuration object for display on the first user interface associated with the first computing device associated with the first user;

determining or receiving, using the one or more computing device processors, a first input, wherein the first input comprises location data;

transmitting, using the one or more computing device processors, based on the determining or receiving the first input, the first input for display on the first user interface associated with the first computing device associated with the first user;

receiving, using the one or more computing device processors, from the first computing device associated with the first user, a second input, wherein the second input comprises a computing group;

transmitting, using the one or more computing device processors, based on the receiving the second input, the second input for display on the first user interface associated with the first computing device associated with the first user;

receiving, using the one or more computing device processors, from the first computing device associated with the first user, a third input, wherein the third input comprises at least one customization selection;

transmitting, using the one or more computing device processors, based on the receiving the third input, the third input for display on the first user interface associated with the first computing device associated with the first user;

receiving, using the one or more computing device processors, from the first computing device associated with the first user, a third selection;

in response to the receiving the third selection, generating, using the one or more computing device processors and a first intelligence model, based on the first input, the second input, and the third input, a first configuration, wherein the first configuration comprises at least one first item and first security data associated with the at least one first item, wherein the first intelligence model is in communication with a first database, wherein the first database comprises user data associated with the first user and historical data, and wherein the generating the first configuration is further based on the user data associated with the first user and the historical data;

transmitting, using the one or more computing device processors, the first configuration for display on the first user interface associated with the first computing device associated with the first user;

in response to the receiving the third selection, generating, using the one or more computing device processors and the first intelligence model, based on the first input, the second input, and the third input, a second configuration, wherein the second configuration comprises at least one second item and second security data associated with the at least one second item, and wherein the generating the second configuration is further based on the user data associated with the first user and the historical data;

transmitting, using the one or more computing device processors, the second configuration for display on the first user interface associated with the first computing device associated with the first user;

in response to the receiving the third selection, generating, using the one or more computing device processors and the first intelligence model, based on the first input, the second input, and the third input, a third configuration, wherein the third configuration comprises at least one third item and third security data associated with the at least one third item, and wherein the generating the second configuration is further based on the user data associated with the first user and the historical data;

transmitting, using the one or more computing device processors, the third configuration for display on the first user interface associated with the first computing device associated with the first user; and ranking, using the one or more computing device processors and the first intelligence model, the first configuration, the second configuration, and the third configuration.

2. The method of claim 1, further comprising receiving, using the one or more computing device processors, from the first computing device associated with the first user, a fourth input, wherein the fourth input comprises a classifier associated with the first user.

3. The method of claim 2, wherein at least one of:

the generating, based on the first input, the second input, and the third input, the first configuration is further based on the fourth input, the generating, based on the first input, the second input, and the third input, the second configuration is further based on the fourth input, the generating, based on the first input, the second input, and the third input, the third configuration is further based on the fourth input, or the classifier associated with the first user comprises or is associated with a position type or designation associated with the first user.

4. The method of claim 1, wherein the at least one customization selection comprises at least one of: an optimization selection, a personalization selection, a warranty selection, a certification level selection, or a standard selection.

5. The method of claim 1, wherein the location data comprises at least one of: store data, branch data, an address, a city, a state, or an area code.

6. The method of claim 1, wherein the computing group comprises at least one of: a manufacturer, a producer, a provider, a distributor, a company, or a business.

7. The method of claim 1, wherein the one or more computing device processors are comprised in one or more computing systems, wherein the one or more computing systems are located in one or more locations.

8. The method of claim 1, wherein an artificial intelligence assistant facilitates at least one of: the receiving the first input, the receiving the second input, or the receiving the third input.

9. An apparatus for generating at least one configuration using an intelligence model in a computing network, the apparatus comprising:

one or more computing system processors; and memory storing instructions that, when executed by the one or more computing system processors, cause the apparatus to:

determine a first user accesses a first system;

receive, from a first computing device associated with the first user, a first selection, wherein the first selection comprises a first configuration option;

transmit, based on the first selection, a first computing object for display on a first user interface associated with the first computing device associated with the first user;

receive, from the first computing device associated with the first user, a second selection, wherein the second selection comprises a second configuration option;

transmit, based on the second selection, a first configuration object for display on the first user interface associated with the first computing device associated with the first user;

determine or receive a first input, wherein the first input comprises location data;

transmit, based on determining or receiving the first input, the first input for display on the first user interface associated with the first computing device associated with the first user;

receive, from the first computing device associated with the first user, a second input, wherein the second input comprises a computing group;

transmit, based on the receiving the second input, the second input for display on the first user interface associated with the first computing device associated with the first user;

receive, from the first computing device associated with the first user, a third input, wherein the third input comprises at least one customization selection;

transmit, based on the receiving the third input, the third input for display on the first user interface associated with the first computing device associated with the first user;

receive, from the first computing device associated with the first user, a third selection;

in response to receiving the third selection, generate, using a first intelligence model, based on the first input, the second input, and the third input, a first configuration, wherein the first configuration comprises at least one first item and first security data associated with the at least one first item, wherein the first intelligence model is in communication with a first database, wherein the first database comprises user data associated with the first user and historical data, and wherein the generate the first configuration is further based on the user data associated with the first user and the historical data;

transmit the first configuration for display on the first user interface associated with the first computing device associated with the first user;

in response to receiving the third selection, generate, using the first intelligence model, based on the first input, the second input, and the third input, a second configuration, wherein the second configuration comprises at least one second item and second security data associated with the at least one second item, and wherein the generate the second configuration is further based on the user data associated with the first user and the historical data;

transmit the second configuration for display on the first user interface associated with the first computing device associated with the first user;

in response to receiving the third selection, generate, using the first intelligence model, based on the first input, the second input, and the third input, a third configuration, wherein the third configuration comprises at least one third item and third security data associated with the at least one third item, and wherein the generate the third configuration is further based on the user data associated with the first user and the historical data;

transmit the third configuration for display on the first user interface associated with the first computing device associated with the first user; and rank, using the first intelligence model, the first configuration, the second configuration, and the third configuration.

10. The apparatus of claim 9, wherein the intelligence model is hosted on a third-party server.

11. The apparatus of claim 9, wherein the intelligence model is hosted on a local server.

12. The apparatus of claim 9, wherein at least one of:

the first configuration is associated with supplying the at least one first item to the first user, or the first configuration comprises a template.

13. The apparatus of claim 9, wherein at least one of:

the first security data is associated with the at least one customization selection, or the first security data comprises or is associated with warranty data associated with the at least one first item.

14. The apparatus of claim 9, wherein the rank the first configuration, the second configuration, and the third configuration is based on at least one of: the first security data, the second security data, the third security data, account history data associated with the first user, or account history data associated with a second user.

15. The apparatus of claim 9, wherein the apparatus comprises or is comprised in one or more computing systems associated with one or more locations.

16. A method for generating at least one configuration using an intelligence model in a computing network, the method comprising:

determining, using one or more computing device processors, a first user accesses a first system;

receiving, using the one or more computing device processors, from a first computing device associated with the first user, a first selection, wherein the first selection comprises a first configuration option;

transmitting, using the one or more computing device processors, based on the first selection, a first computing object for display on a first user interface associated with the first computing device associated with the first user;

receiving, using the one or more computing device processors, from the first computing device associated with the first user, a second selection, wherein the second selection comprises a second configuration option;

transmitting, using the one or more computing device processors, based on the second selection, a first configuration object for display on the first user interface associated with the first computing device associated with the first user;

determining or receiving, using the one or more computing device processors, a first input, wherein the first input comprises location data;

transmitting, using the one or more computing device processors, based on the determining or receiving the first input, the first input for display on the first user interface associated with the first computing device associated with the first user;

receiving, using the one or more computing device processors, from the first computing device associated with the first user, a second input, wherein the second input comprises a computing group;

transmitting, using the one or more computing device processors, based on the receiving the second input, the second input for display on the first user interface associated with the first computing device associated with the first user;

receiving, using the one or more computing device processors, from the first computing device associated with the first user, a third input, wherein the third input comprises at least one customization selection;

transmitting, using the one or more computing device processors, based on the receiving the third input, the third input for display on the first user interface associated with the first computing device associated with the first user;

receiving, using the one or more computing device processors, from the first computing device associated with the first user, a third selection;

in response to the receiving the third selection, generating, using the one or more computing device processors and a first intelligence model, based on the first input, the second input, and the third input, a first configuration, wherein the first configuration comprises at least one first item, wherein the first intelligence model is in communication with a first database, wherein the first database comprises user data associated with the first user and historical data, and wherein the generating the first configuration is further based on the user data associated with the first user and the historical data;

transmitting, using the one or more computing device processors, the first configuration for display on the first user interface associated with the first computing device associated with the first user;

in response to the receiving the third selection, generating, using the one or more computing device processors and the first intelligence model, based on the first input, the second input, and the third input, a second configuration, wherein the second configuration comprises at least one second item, and wherein the generating the second configuration is further based on the user data associated with the first user and the historical data;

transmitting, using the one or more computing device processors, the second configuration for display on the first user interface associated with the first computing device associated with the first user;

in response to the receiving the third selection, generating, using the one or more computing device processors and the first intelligence model, based on the first input, the second input, and the third input, a third configuration, wherein the third configuration comprises at least one third item, and wherein the generating the third configuration is further based on the user data associated with the first user and the historical data;

transmitting, using the one or more computing device processors, the third configuration for display on the first user interface associated with the first computing device associated with the first user; and ranking, using the one or more computing device processors and the first intelligence model, the first configuration, the second configuration, and the third configuration.

17. The method of claim 16, further comprising receiving, using the one or more computing device processors, from the first computing device associated with the first user, a fourth selection, wherein the fourth selection comprises the first configuration.

18. The method of claim 17, further comprising:

receiving, using the one or more computing device processors, from the first computing device associated with the first user, a fifth selection or a fourth input associated with a first item comprised in the at least one first item; and updating, based on the fifth selection or the fourth input associated with the first item comprised in the at least one first item, the first configuration.

19. The method of claim 16, further comprising receiving, using the one or more computing device processors, from the first computing device associated with the first user, a fourth input, wherein the fourth input comprises an indicator associated with the first user.

20. The method of claim 19, wherein at least one of:

the generating, based on the first input, the second input, and the third input, the first configuration is further based on the fourth input, the generating, based on the first input, the second input, and the third input, the second configuration is further based on the fourth input, the generating, based on the first input, the second input, and the third input, the third configuration is further based on the fourth input, the indicator associated with the first user comprises or is associated with a certification level or credentials associated with the first user, or the indicator associated with the first user is associated with the at least one customization selection or the computing group.

21. The method of claim 16, wherein the one or more computing device processors are comprised in one or more computing systems, wherein the one or more computing systems are located in one or more locations.

* * * * *